United States Patent
Hu et al.

(10) Patent No.: US 11,139,906 B2
(45) Date of Patent: Oct. 5, 2021

(54) WIRELESS COMMUNICATION METHOD AND WIRELESS COMMUNICATIONS APPARATUS

(71) Applicant: HUAWEI TECHNOLOGIES CO., LTD., Shenzhen (CN)

(72) Inventors: Yuanzhou Hu, Shanghai (CN); Mengying Ding, Shanghai (CN); Zhongfeng Li, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/673,978

(22) Filed: Nov. 5, 2019

(65) Prior Publication Data
US 2020/0067621 A1 Feb. 27, 2020

Related U.S. Application Data

(63) Continuation of application No. PCT/CN2018/091669, filed on Jun. 15, 2018.

(30) Foreign Application Priority Data

Jun. 16, 2017 (CN) .......................... 201710459753.2

(51) Int. Cl.
*H04L 13/00* (2006.01)
*H04J 13/00* (2011.01)
(Continued)

(52) U.S. Cl.
CPC ....... *H04J 13/0062* (2013.01); *H04J 11/0023* (2013.01); *H04L 5/0048* (2013.01);
(Continued)

(58) Field of Classification Search
CPC . H04J 13/0062; H04J 11/0023; H04L 5/0048; H04L 25/0224; H04L 27/2605; H04L 27/262
See application file for complete search history.

(56) References Cited

U.S. PATENT DOCUMENTS

2011/0183609 A1 7/2011 Noh et al.
2012/0176999 A1 7/2012 Zhang et al.
(Continued)

FOREIGN PATENT DOCUMENTS

CN 101601250 A 12/2009
CN 101695191 A 4/2010
(Continued)

OTHER PUBLICATIONS

Huawei et al.,"Functionalities and design of reference signal for demodulation of UL Channels",3GPP TSG RAN WG1 Meeting #87 R1-1611246,Reno, USA, Nov. 14-18, 2016,total 5 pages.
(Continued)

*Primary Examiner* — Khai M Nguyen
(74) *Attorney, Agent, or Firm* — Hauptman Ham, LLP

(57) ABSTRACT

A wireless communication method includes determining a length of a ZC sequence based on a resource block quantity or a subcarrier quantity corresponding to a system bandwidth and determining a reference signal sequence included in an uplink reference signal based on the length of the ZC sequence and a resource block quantity or a subcarrier quantity corresponding to an allocated user bandwidth that is a part of the system bandwidth. When different communications devices use the same system bandwidth for communication, reference signal sequences used by the different communications devices correspond to the same ZC sequence length. The ZC sequence length is exclusively designed for a resource block quantity or a carrier quantity of the system bandwidth. Generation of the reference signal
(Continued)

S210. Determine a length of a ZC sequence based on a resource block quantity or a subcarrier quantity corresponding to a system bandwidth S220. Determine a reference signal sequence based on the length of the ZC sequence and a resource block quantity or a subcarrier quantity corresponding to an allocated user bandwidth sequences is related to mapped locations of the reference signal sequences. Therefore, reference signal sequences used by different communications devices have a relatively high cross correlation.

15 Claims, 4 Drawing Sheets

(51) Int. Cl.
  *H04J 11/00* (2006.01)
  *H04L 5/00* (2006.01)
  *H04L 25/02* (2006.01)
  *H04L 27/26* (2006.01)
(52) U.S. Cl.
  CPC ........ *H04L 25/0224* (2013.01); *H04L 27/262* (2013.01); *H04L 27/2605* (2013.01)

(56) References Cited

U.S. PATENT DOCUMENTS

| | | |
|---|---|---|
| 2012/0195274 A1 | 8/2012 | Iwai et al. |
| 2013/0083751 A1 | 4/2013 | Papasakellariou et al. |
| 2013/0089168 A1 | 4/2013 | Nakao et al. |
| 2013/0223397 A1* | 8/2013 | Kim ............... H04L 5/0094 370/329 |
| 2015/0009847 A1* | 1/2015 | Iwai ............... H04J 13/22 370/252 |
| 2016/0072615 A1 | 3/2016 | Mccoy |
| 2017/0366377 A1* | 12/2017 | Papasakellariou .... H04L 27/261 |
| 2019/0342052 A1* | 11/2019 | Hu ............... H04J 13/0062 |
| 2019/0357204 A1* | 11/2019 | Matsumura ......... H04L 27/2613 |

FOREIGN PATENT DOCUMENTS

| | | | |
|---|---|---|---|
| CN | 101741793 A | 6/2010 | |
| CN | 101743709 A | 6/2010 | |
| CN | 102142916 A | 8/2011 | |
| CN | 103973392 A | 8/2014 | |
| GB | 2446446 A * | 8/2008 | ........... H04B 7/2615 |

OTHER PUBLICATIONS

Ericsson,"On block RS design enabling low CM",3GPP TSG-RAN WG1#87 R1-1612344,Reno, USA Nov. 14-18, 2016,total 3 pages.
Huawei et al.,"UL SRS design for CSI acquisition and beam management",3GPP TSG RAN WG1 Meeting #88bis R1-1704241, Spokane, USA Apr. 3-7, 2017,total 16 pages.

* cited by examiner

S210. Determine a length of a ZC sequence based on a resource block quantity or a subcarrier quantity corresponding to a system bandwidth S220. Determine a reference signal sequence based on the length of the ZC sequence and a resource block quantity or a subcarrier quantity corresponding to an allocated user bandwidth

WIRELESS COMMUNICATION METHOD AND WIRELESS COMMUNICATIONS APPARATUS

CROSS-REFERENCE TO RELATED APPLICATIONS

This application is a continuation of International Application No. PCT/CN2018/091669, filed on Jun. 15, 2018, which claims priority to Chinese Patent Application No. 2017/10459753.2, filed on Jun. 16, 2017. The disclosures of the aforementioned applications are hereby incorporated by reference in their entireties.

TECHNICAL FIELD

This application relates to the communications field, and in particular, to a wireless communication method and a wireless communications apparatus in a wireless communications system.

BACKGROUND

In a wireless communications system, a reference signal (RS) is also referred to as a pilot signal, and is a predefined signal sent by a sending device to a receiving device on a predefined resource. The receiving device may obtain channel-related information based on the received reference signal, to complete channel estimation or channel sounding. A channel sounding result may be used for resource scheduling and link adaptation, and a channel estimation result may be used by the receiving device to demodulate data. Generally, to accurately obtain channel-related information, different reference signals need to be orthogonal. A plurality of reference signals that are mutually orthogonal are usually provided through time division, frequency division, code division, or the like. In a long term evolution (LTE) system, an uplink reference signal includes an uplink demodulation reference signal (DMRS) and an uplink sounding reference signal (SRS), and a downlink reference signal includes a cell specific reference signal (CRS), a downlink DMRS, a channel state information reference signal (CSI-RS), a multimedia broadcast multicast service single frequency network reference signal (MBSFN RS), and a positioning reference signal (PRS). A reference signal, especially, an uplink reference signal, requires a low peak-to-average power ratio (PAPR) and a low raw cubic metric (RCM), to prevent demodulation performance from being deteriorated because distortion of a reference signal that passes through a power amplifier (PA) is more serious than that of data that passes through the power amplifier. Therefore, a Zadoff-Chu (ZC) sequence is used as the uplink reference signal sequence in the LTE system, so that the uplink reference signal is characterized by the low PAPR/RCM.

Frequency domain resources occupied by reference signals of different user equipment (UE) may partially overlap. To reduce mutual interference generated after the reference signals of the different UEs partially overlap, in a method for sending a reference signal, generation of a reference signal is related to a mapped location of the reference signal, and a reference signal sent by UE is processed through a cyclic shift (CS), so that reference signals of different UEs are orthogonal, thereby canceling mutual interference of the reference signals of the different UEs.

However, according to a method for sending a reference signal in the prior art, because a manner of generating reference signals sent by different UEs is unrelated to mapped locations of the reference signals, the reference signals sent by the UEs cannot be orthogonal through a cyclic shift, and therefore a cross correlation between partially overlapping reference signals is relatively low and a requirement of a communications system cannot be met.

SUMMARY

In view of this, this application provides a wireless communication method and a wireless communications apparatus. A ZC sequence used by a communications device is determined based on a resource block quantity corresponding to a system bandwidth or a subcarrier quantity corresponding to system bandwidth. In this way, the length of the ZC sequence corresponding to the system bandwidth is shortened, and the cross correlation between reference signals of different terminal devices that use the system bandwidth is improved, so that mutual interference of reference signals of different communications devices can be reduced.

According to a first aspect, a wireless communication method is provided, where the method includes: determining a length of a ZC sequence based on a resource block quantity or a subcarrier quantity corresponding to a system bandwidth; and determining a reference signal sequence based on the length of the ZC sequence and a resource block quantity or a subcarrier quantity corresponding to an allocated user bandwidth, where the reference signal sequence is included in an uplink reference signal, and the allocated user bandwidth is a part of the system bandwidth.

According to the wireless communication method provided in this application, when different communications devices use a same system bandwidth for communication, reference signal sequences used by the different communications devices correspond to a same ZC sequence length. The ZC sequence length is exclusively designed for a resource block quantity or a subcarrier quantity of the system bandwidth, and generation of the reference signal sequences is related to mapped locations of the reference signal sequences. Therefore, according to the wireless communication method provided in this application, reference signal sequences used by different communications devices have a higher cross correlation than those in the prior art.

According to a second aspect, a wireless communications apparatus is provided, where the apparatus includes a memory, a processor, and a computer program that is stored in the memory and is capable of running on the processor. The processor runs the computer program to enable the wireless communications apparatus to perform the following processing process:

determining a length of a ZC sequence based on a resource block quantity or a subcarrier quantity corresponding to a system bandwidth; and determining a reference signal sequence based on the length of the ZC sequence and a resource block quantity or a subcarrier quantity corresponding to an allocated user bandwidth.

The reference signal sequence is included in an uplink reference signal, and the allocated user bandwidth is a part of the system bandwidth.

According to the wireless communications apparatus provided in this application, when different communications apparatuses use a same system bandwidth for communication, reference signal sequences used by the different communications apparatuses correspond to a same ZC sequence length. The ZC sequence length is exclusively designed for a resource block quantity or a carrier quantity of the system bandwidth. Therefore, the reference signal sequences used by the different communications apparatuses provided in this application have a higher cross correlation than those in the prior art in which different system bandwidths correspond to a same ZC sequence length.

According to a third aspect, a wireless communications apparatus is provided. The wireless communications apparatus is, for example, a base station or a communications chip in a base station, and includes a processing unit and a receiving unit.

The processing unit is configured to:

determine a length of a ZC sequence based on a resource block quantity or a subcarrier quantity corresponding to a system bandwidth; and determine a reference signal sequence based on the length of the ZC sequence and a resource block quantity or a subcarrier quantity corresponding to an allocated user bandwidth, where the reference signal sequence is included in an uplink reference signal, and the allocated user bandwidth is a part of the system bandwidth.

The receiving unit is configured to receive the uplink reference signal.

According to the wireless communications apparatus provided in this application, when different communications apparatuses use a same system bandwidth for communication, reference signal sequences used by the different communications apparatuses correspond to a same ZC sequence length. The ZC sequence length is exclusively designed for a resource block quantity or a carrier quantity of the system bandwidth. Therefore, the reference signal sequences used by the different communications apparatuses provided in this application have a higher cross correlation than those in the prior art in which different system bandwidths correspond to a same ZC sequence length.

According to a fourth aspect, a wireless communications apparatus is provided. The wireless communications apparatus is, for example, a terminal device or a communications chip in a terminal device, and includes a processing unit and a sending unit.

The processing unit is configured to:

determine a length of a ZC sequence based on a resource block quantity corresponding to a system bandwidth; and determine a reference signal sequence based on the length of the ZC sequence and a resource block quantity or a subcarrier quantity corresponding to an allocated user bandwidth, where the reference signal sequence is included in an uplink reference signal, and the allocated user bandwidth is a part of the system bandwidth.

The sending unit is configured to send the uplink reference signal.

According to the wireless communications apparatus provided in this application, when different communications apparatuses use a same system bandwidth for communication, reference signal sequences used by the different communications apparatuses correspond to a same ZC sequence length. The ZC sequence length is exclusively designed for a resource block quantity or a carrier quantity of the system bandwidth. Therefore, the reference signal sequences used by the different communications apparatuses provided in this application have a higher cross correlation than those in the prior art in which different system bandwidths correspond to a same ZC sequence length.

According to a fifth aspect, a computer storage medium is provided. The computer-readable storage medium stores computer program code, and when the computer program code is executed by a processor, a wireless communications apparatus performs the following processing process:

determining a length of a ZC sequence based on a resource block quantity corresponding to a system bandwidth; and determining a reference signal sequence based on the length of the ZC sequence and a resource block quantity corresponding to an allocated user bandwidth, where the reference signal sequence is included in an uplink reference signal, and the allocated user bandwidth is a part of the system bandwidth.

According to a sixth aspect, a computer program product is provided. The computer program product includes computer program code, and when the computer program code is executed by a communications unit and a processing unit, or a transceiver and a processor of a wireless communications apparatus, the wireless communications apparatus performs the following processing process:

determining a length of a ZC sequence based on a resource block quantity corresponding to a system bandwidth; and determining a reference signal sequence based on the length of the ZC sequence and a resource block quantity corresponding to an allocated user bandwidth, where the reference signal sequence is included in an uplink reference signal, and the allocated user bandwidth is a part of the system bandwidth.

In any one of the first aspect to the sixth aspect:

Optionally, the determining a length of a ZC sequence based on a resource block quantity or a subcarrier quantity corresponding to a system bandwidth includes: determining the length of the ZC sequence based on the resource block quantity corresponding to the system bandwidth and a comb value, or determining the length of the ZC sequence based on the subcarrier quantity corresponding to the system bandwidth and a comb value.

Optionally, the determining the length of the ZC sequence based on the resource block quantity or the subcarrier quantity corresponding to the system bandwidth and a comb value includes:

when the resource block quantity corresponding to the system bandwidth is greater than a resource block threshold (or the subcarrier quantity is greater than a subcarrier threshold), and the comb value is a first value, determining, from at least two sequence lengths, a first sequence length as the length of the ZC sequence.

Optionally, when the first value is 2, the first sequence length is 3469, and a root of the ZC sequence is one of the following values:

82, 122, 135, 148, 261, 273, 279, 309, 320, 324, 334, 399, 538, 600, 663, 665, 670, 739, 758, 782, 805, 907, 916, 1013, 1204, 1244, 1271, 1353, 1505, 1588, 1686, 1783, 1881, 1964, 2116, 2198, 2225, 2265, 2456, 2553, 2562, 2664, 2687, 2711, 2730, 2799, 2804, 2806, 2869, 2931, 3070, 3135, 3145, 3149, 3160, 3190, 3196, 3208, 3321, 3334, 3347, and 3387.

Optionally, when the first value is 4, the first sequence length is 3187, and a root of the ZC sequence is one of the following values:

173, 251, 275, 280, 298, 366, 437, 441, 474, 499, 513, 565, 589, 677, 695, 698, 722, 862, 972, 973, 986, 991, 993, 1001, 1182, 1205, 1308, 1404, 1503, 1512, 1675, 1684, 1783, 1879, 1982, 2005, 2186, 2194, 2196, 2201, 2214, 2215, 2325, 2465, 2489, 2492, 2510, 2598, 2622, 2674, 2688, 2713, 2746, 2750, 2821, 2889, 2907, 2912, 2936, and 3014.

Optionally, the determining, by a terminal, the length of the ZC sequence based on the resource block quantity corresponding to the system bandwidth and a comb value includes:

when the resource block quantity corresponding to the system bandwidth is less than or equal to a resource block threshold (or the subcarrier quantity is less than or equal to a subcarrier threshold), and the comb value is a first value, determining, from at least two sequence lengths, a second sequence length as the length of the ZC sequence.

Optionally, when the first value is 2, the second length is 1103, and a root of the ZC sequence is one of the following values:

31, 56, 59, 75, 80, 97, 103, 108, 131, 133, 142, 264, 285, 308, 321, 323, 349, 380, 391, 392, 407, 426, 458, 462, 479, 484, 494, 503, 504, 506, 507, 596, 597, 599, 600, 609, 619, 624, 641, 645, 677, 696, 711, 712, 723, 754, 780, 782, 795, 818, 839, 961, 970, 972, 995, 1000, 1006, 1023, 1028, 1044, 1047, and 1072.

Optionally, when the first value is 4, the second length is 1187, and a root of the ZC sequence is one of the following values:

76, 77, 83, 104, 105, 114, 154, 116, 126, 175, 186, 208, 271, 278, 333, 345, 351, 363, 368, 428, 434, 453, 483, 490, 501, 514, 523, 545, 556, 557, 630, 631, 642, 664, 673, 686, 697, 704, 734, 753, 759, 819, 824, 836, 842, 854, 909, 916, 979, 1001, 1012, 1033, 1061, 1071, 1073, 1082, 1083, 1104, 1110, and 1111.

Optionally, the resource block threshold is one of the following values:

100, 102, 104, 105, 106, 108, and 110.

Optionally, when each resource block includes $N_{RB}^{SC}$ subcarriers, $N_{RB}^{SC}$ may be a positive integer such as 12 or 24, and the subcarrier threshold is one of the following values:

100 $N_{RB}^{SC}$, 102 $N_{RB}^{SC}$, 104 $N_{RB}^{SC}$, 105 $N_{RB}^{SC}$, 106 $N_{RB}^{SC}$, 108 $N_{RB}^{SC}$, and 110 $N_{RB}^{SC}$.

Optionally, the comb value includes 1, 2, or 4.

According to a seventh aspect, this application further provides a wireless communication method, where the method includes: determining a reference signal sequence based on a ZC sequence, where the ZC sequence is a ZC sequence in the following ZC sequence group:

A length of the ZC sequence is 1427, and values of roots q are some or all of the following values: 39, 78, 99, 105, 122, 132, 147, 254, 296, 298, 304, 341, 374, 399, 401, 417, 431, 435, 437, 512, 513, 524, 527, 542, 552, 582, 592, 644, 656, 664, 763, 771, 783, 835, 845, 875, 885, 900, 903, 914, 915, 990, 992, 996, 1010, 1026, 1028, 1053, 1086, 1123, 1129, 1131, 1173, 1280, 1295, 1305, 1322, 1328, 1349, and 1388; or a length of the ZC sequence is 1279, and values of roots q are some or all of the following values: 66, 70, 83, 112, 125, 152, 154, 177, 189, 190, 191, 204, 207, 221, 229, 230, 236, 247, 292, 346, 374, 375, 401, 524, 525, 530, 536, 574, 587, 588, 691, 692, 705, 743, 749, 754, 755, 878, 904, 905, 933, 987, 1032, 1043, 1049, 1050, 1058, 1072, 1075, 1088, 1089, 1090, 1102, 1125, 1127, 1154, 1167, 1196, 1209, and 1213; or a length of the ZC sequence is 3733, and values of roots q are some or all of the following values: 99, 173, 261, 294, 321, 349, 360, 401, 502, 512, 563, 582, 693, 697, 704, 720, 885, 976, 1013, 1040, 1329, 1342, 1352, 1425, 1459, 1525, 1690, 1705, 1751, 1774, 1809, 1814, 1919, 1924, 1959, 1982, 2028, 2043, 2208, 2274, 2308, 2381, 2391, 2404, 2693, 2720, 2757, 2848, 3013, 3029, 3036, 3040, 3151, 3170, 3221, 3231, 3332, 3373, 3384, 3412, 3439, 3472, 3560, and 3634; or a length of the ZC sequence is 3527, and values of roots q are some or all of the following values: 179, 199, 257, 259, 263, 305, 309, 314, 404, 412, 536, 548, 607, 610, 618, 631, 665, 749, 795, 798, 804, 822, 826, 1071, 1106, 1296, 1449, 1461, 1463, 1494, 1554, 1580, 1947, 1973, 2033, 2064, 2066, 2078, 2231, 2421, 2456, 2701, 2705, 2723, 2729, 2732, 2778, 2862, 2896, 2909, 2917, 2920, 2979, 2991, 3115, 3123, 3213, 3218, 3222, 3264, 3268, 3270, 3328, and 3348; or a length of the ZC sequence is 2621, and values of roots q are some or all of the following values: 133, 135, 140, 148, 157, 167, 178, 206, 211, 213, 301, 317, 340, 386, 391, 450, 451, 487, 488, 509, 574, 614, 692, 693, 695, 696, 736, 773, 802, 815, 822, 823, 962, 991, 993, 1000, 1003, 1083, 1216, 1236, 1237, 1384, 1385, 1405, 1538, 1618, 1621, 1628, 1630, 1659, 1798, 1799, 1806, 1819, 1848, 1885, 1925, 1926, 1928, 1929, 2007, 2047, 2112, 2133, 2134, 2170, 2171, 2230, 2235, 2281, 2304, 2320, 2408, 2410, 2415, 2443, 2454, 2464, 2473, 2481, 2486, and 2488; or a length of the ZC sequence is 2203, and values of roots q are some or all of the following values: 227, 230, 234, 237, 253, 285, 303, 351, 381, 382, 392, 416, 421, 469, 480, 499, 504, 512, 578, 585, 594, 596, 609, 669, 674, 683, 693, 794, 796, 833, 843, 905, 913, 954, 961, 966, 1237, 1242, 1249, 1290, 1298, 1360, 1370, 1407, 1409, 1510, 1520, 1529, 1534, 1594, 1607, 1609, 1618, 1625, 1691, 1699, 1704, 1723, 1734, 1782, 1787, 1811, 1821, 1822, 1852, 1900, 1918, 1950, 1966, 1969, 1973, and 1976; or a length of the ZC sequence is 5279, and values of roots q are some or all of the following values: 260, 324, 359, 430, 490, 787, 804, 842, 849, 907, 925, 1010, 1018, 1190, 1399, 1424, 1615, 1645, 1655, 1658, 1875, 1957, 1958, 2001, 2014, 2015, 2212, 2228, 2304, 2320, 2325, 2954, 2959, 2975, 3051, 3067, 3264, 3265, 3278, 3321, 3322, 3404, 3621, 3624, 3634, 3664, 3855, 3880, 4089, 4261, 4269, 4354, 4372, 4430, 4437, 4475, 4492, 4789, 4849, 4920, 4955, and 5019; or a length of the ZC sequence is 4703, and values of roots q are some or all of the following values: 540, 559, 611, 644, 701, 736, 750, 822, 824, 846, 1064, 1246, 1272, 1302, 1310, 1369, 1378, 1423, 1438, 1475, 1476, 1654, 1723, 1726, 1744, 1927, 1928, 1942, 2049, 2053, 2064, 2105, 2598, 2639, 2650, 2654, 2761, 2775, 2776, 2959, 2977, 2980, 3049, 3227, 3228, 3265, 3280, 3325, 3334, 3393, 3401, 3431, 3457, 3639, 3857, 3879, 3881, 3953, 3967, 4002, 4059, 4092, 4144, and 4163.

According to an eighth aspect, a wireless communications apparatus is provided, where the apparatus includes a memory, a processor, and a computer program that is stored in the memory and is capable of running on the processor. The processor runs the computer program to enable the wireless communications apparatus to perform the following processing process:

determining a reference signal sequence based on a ZC sequence, where the ZC sequence is one of the ZC sequences described in the seventh aspect.

According to a ninth aspect, a wireless communications apparatus is provided. The wireless communications apparatus is, for example, a base station or a communications chip in a base station, and includes a processing unit and a receiving unit.

The processing unit is configured to:

determine a reference signal sequence based on a ZC sequence, where the ZC sequence is a ZC sequence in the ZC sequence group described in the seventh aspect.

According to a tenth aspect, a wireless communications apparatus is provided. The wireless communications apparatus is, for example, a terminal device or a communications chip in a terminal device, and includes a processing unit and a sending unit.

The processing unit is configured to:

determine a reference signal sequence based on a ZC sequence, where the ZC sequence is a ZC sequence in the ZC sequence group described in the seventh aspect.

According to an eleventh aspect, a computer storage medium is provided. The computer-readable storage medium stores computer program code, and when the computer program code is executed by a processor, a wireless communications apparatus performs the following processing process:

determining a reference signal sequence based on a ZC sequence, where the ZC sequence is a ZC sequence in the ZC sequence group described in the seventh aspect.

According to a twelfth aspect, a computer program product is provided. The computer program product includes computer program code, and when the computer program code is executed by a communications unit and a processing unit, or a transceiver and a processor of a wireless communications apparatus, the wireless communications apparatus performs the following processing process:

determining a reference signal sequence based on a ZC sequence, where the ZC sequence is a ZC sequence in the ZC sequence group described in the seventh aspect.

DESCRIPTION OF EMBODIMENTS

A communications device in the embodiments may be any device having a wireless receiving and sending function, including but not limited to a NodeB, an evolved NodeB (eNodeB), a gNodeB in a 5th generation (5G) mobile communications system, a base station or a network device in a future communications system, and an access node in a wireless fidelity (WiFi) system, a wireless relay node, a wireless backhaul node, and UE. The UE may also be referred to as a terminal, a mobile station (MS), a mobile terminal (MT), or the like. The UE may communicate with one or more core networks by using a radio access network (RAN), or may access a distributed network in a self-organizing manner or scheduling-free manner. Alternatively, the UE may access a wireless network in another manner for communication, or may directly perform wireless communication with another UE. This is not limited in the present disclosure.

The communications device in the present disclosure may be deployed on land, for example, an indoor, outdoor, handheld, or in-vehicle device, may be deployed on water, or may be deployed on an airplane, a balloon, and a satellite in the air or space. The UE in the embodiments may be a mobile phone, a tablet computer (Pad), a computer having a wireless receiving and sending function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The application scenario is not limited in the present disclosure.

Figures 1, 2:
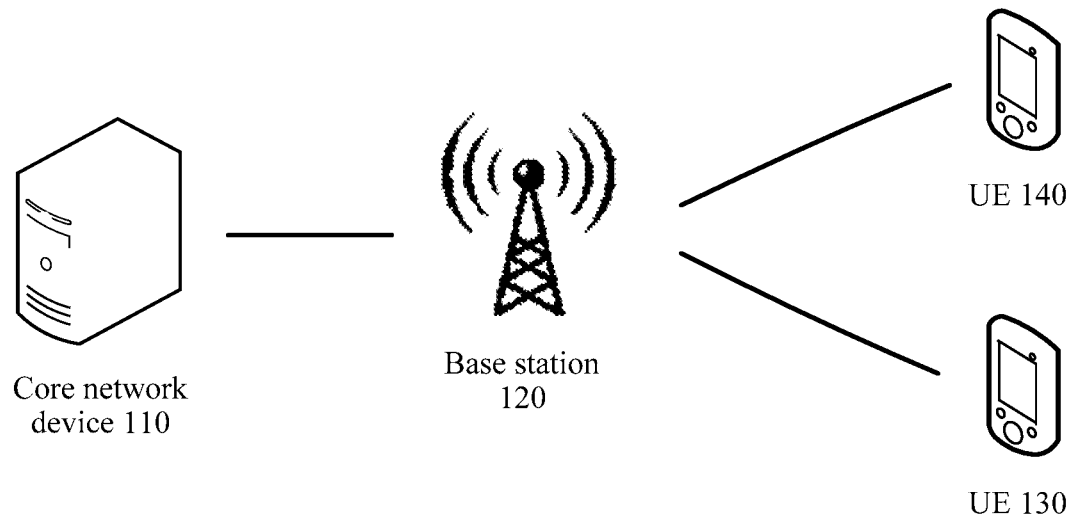
FIG. 1 is a schematic diagram of a communications system to which this application is applicable.
FIG. 2 is a schematic diagram of a communication method according to this application.

FIG. 1 is a schematic diagram of the architecture of a communications system to which the embodiments are applied. As shown in FIG. 1, the communications system includes a core network device 110, a base station 120, UE 130, and UE 140 that are connected wirelessly, wiredly, or in another manner. The UE 130 and the UE 140 may be stationary or mobile. FIG. 1 is only a schematic diagram, and the communications system may further include another network device and/or another terminal device that are/is not shown in FIG. 1.

The embodiments may be applied to downlink data transmission, uplink data transmission, or device-to-device (D2D) data transmission. For the downlink data transmission, a sending device is a base station, and a corresponding receiving device is UE. For the uplink data transmission, the sending device is UE, and the corresponding receiving device is a base station. For the D2D data transmission, the sending device is UE, and the corresponding receiving device is also UE. This is not limited in the embodiments.

To facilitate understanding of this application, before an uplink information sending method provided in this application is described, concepts in this application are briefly described first.

A maximum continuous bandwidth in which a base station can operate may be referred to as a carrier bandwidth (which may also be referred to as a "system bandwidth"). An uplink user operates in the carrier bandwidth. A bandwidth, allocated to UE by the base station, for sending data is referred to as an allocated user bandwidth (which is sometimes referred to as an "allocated bandwidth"). A quantity of resource blocks (RB) included in the carrier bandwidth and a quantity of subcarriers included in the carrier bandwidth may depend on the carrier bandwidth and a subcarrier spacing. For example, the carrier bandwidth is 20 megabits (M) and the subcarrier spacing is 15 kilohertz (KHz). The quantity of resource blocks included in the carrier bandwidth may be 100, 104, or 110, and the quantity of subcarriers included in the carrier bandwidth may be 1200, 1248, or 1320. For example, the carrier bandwidth is 50 M and the subcarrier spacing is 15 KHz. The quantity of resource blocks included in the carrier bandwidth may be 272 or 275, and the quantity of subcarriers included in the carrier bandwidth may be 3264 or 3300.

A comb is a distance between frequency domain resource locations to which two pieces of neighboring frequency domain reference signal data are mapped. Assuming that frequency domain resource subcarrier locations to which a frequency domain reference signal with a length of X is mapped are $x_0$, $x_0+K$, $x_0+2*K$, $x_0+3*K$, ..., and $x_0+(X-1)*K$, a value of K is a comb value. It is easy to learn that the comb is an integer greater than or equal to 1, and the frequency domain reference signal is mapped to frequency domain resources in a comb shape. In an example of LTE, a comb value of an SRS reference signal may be 2 or 4. In other words, there is one piece of reference signal data on two consecutive subcarriers or four consecutive subcarriers in frequency domain resources after the frequency domain reference signal is mapped.

A minimum granularity of resource allocation is a minimum bandwidth allocated to a reference signal sequence. An SRS is used as an example. When the minimum granularity of resource allocation is four RBs, and an allocated bandwidth is a multiple of four RBs, a group of ZC sequences may be used; or when the minimum granularity of resource allocation is eight RBs, and an allocated bandwidth is a multiple of eight RBs, another group of ZC sequences may be used.

In a communications system, a reference signal is a fixed signal sent by a transmitting end to a receiving end. Because the receiving end knows the signal, the receiving end may process a received signal and a signal of the transmitting end to obtain system-related information or channel-related information such as a channel parameter, channel quality, or signal phase rotation that is caused by a transmitting end component or a receiving end component. In a design of a reference signal, two aspects usually need to be considered: (1) a sequence used for the reference signal; and (2) a manner of orthogonal multiplexing on reference signals of different users and different transmit ports.

In a 5G new radio (NR) standard process, to resolve a coverage problem, a single carrier is determined as one of the required waveforms for an uplink.

Considering that a plurality of users using single carriers are possibly scheduled during uplink multi-user multiple-input multiple-output (MU-MIMO) in NR, because users to which different resources are allocated have different reference signal sequences, the plurality of users using single carriers usually have different reference signal sequences in a resource overlapping part. Therefore, a CS cannot be used as a method for performing orthogonal processing on reference signals. However, frequency division multiplexing (FDM) and time division multiplexing (TDM) may cause a considerable performance loss, and an orthogonal cover code (OCC) can support only two users.

In addition, SRSs of different users in the same cell may partially overlap, in other words, frequency domain resources allocated to a part of the SRSs of the different users may be the same. In this case, if a ZC reference signal design of LTE is used, in one cell, a reference signal, in an overlapping part, of a user may cause serious interference to a reference signal of another user.

Users with different capabilities can access the same large system bandwidth. A system bandwidth of 20 M is used as an example. Users of 1.4 M, 5 M, 10 M, and 20 M can access the bandwidth and time-frequency resources are allocated to the users for transmission. When the users with different capabilities perform SRS transmission and use frequency hopping, because a time interval is required for carrier retuning, generally, for SRSs of the users with different capabilities, frequency hopping can be performed only in bandwidths that can be processed by the users. In an example in which a user with a capability of 10 M accesses a system of 20 M, for an SRS of the user with the capability of 10 M, frequency hopping can be performed only in a bandwidth of 10 M, and frequency hopping cannot be performed in a bandwidth of 20 M. Users with different capabilities can access a same large system bandwidth, and when the users perform SRS transmission and use frequency hopping, because for SRSs of the users with different capabilities, frequency hopping can be performed only in bandwidths that can be processed by the users, time-frequency resources occupied by the SRSs of the different users after the frequency hopping may overlap. Consequently, collision and interference are generated.

Due to introduction of a flexible duplex feature, one of two terminal devices that belong to two neighboring cells may send an uplink frame and the other terminal device may send a downlink frame at the same time. A cell-edge user that sends an uplink frame may cause interference (cross link interference) to a user performing downlink receiving in a neighboring cell, and in this case, the user performing downlink receiving may be subject to relatively strong single carrier interference. The interference may be canceled through interference coordination, or the interference may be canceled by using an advanced receiver at a receiving end. When a user in a current cell is not notified of information about a neighboring cell and interference information, the user in the current cell may obtain channel information of an interfering user by performing blind detection on a reference signal of the interfering user, to cancel interference by using the advanced receiver. If the design of LTE is still used for a reference signal of a single carrier, because different ZC sequences are used for reference signals corresponding to different allocated resources, both a location of a resource of the interfering user and different bandwidths allocated to users need to be considered during blind detection, and consequently, a quantity of times of blind detection is very large.

A key point to resolving the foregoing problem is to design a ZC sequence group. Reference signal sequences corresponding to different allocated bandwidths may be generated by using the ZC sequence group, and generation of the reference signal sequences is related to mapped locations of the reference signal sequences. A cross correlation between reference signal sequences with the same length that are obtained from the ZC sequence group is improved, so that an effect of interference suppression or interference cancelation can be improved.

This application provides a communication method. A ZC sequence used by a communications apparatus is determined based on a resource block quantity corresponding to a system bandwidth or a subcarrier quantity corresponding to a system bandwidth. In this way, a length of the ZC sequence corresponding to the system bandwidth is shortened, and a cross correlation between reference signals of different terminal devices that use the system bandwidth is improved, so that mutual interference of reference signals of different communications devices can be reduced.

FIG. 2 shows a communication method according to this application. The method 200 includes the following steps:

S210. Determine a length of a ZC sequence based on a resource block quantity or a subcarrier quantity corresponding to a system bandwidth.

S220. Determine a reference signal sequence based on the length of the ZC sequence and a resource block quantity or a subcarrier quantity corresponding to an allocated user bandwidth.

The reference signal sequence is included in an uplink reference signal, and the allocated user bandwidth is a part of the system bandwidth.

In the method 200, based on different subcarrier spacings, the same system bandwidth may include different quantities of resource blocks or different quantities of subcarriers, and different system bandwidths may also include the same quantity of resource blocks or a same quantity of subcarriers.

In an optional example, after determining the length of the ZC sequence based on the resource block quantity or the subcarrier quantity corresponding to the system bandwidth, a communications device may determine a group of ZC sequences.

According to a method in the prior art, the communications device may determine a root, determine a ZC sequence from the group of ZC sequences based on the root, and obtains, from the ZC sequence through interception, a sequence that matches an allocated bandwidth of the communications device, to generate a reference signal sequence.

It should be understood that the determining a length of a ZC sequence based on a resource block quantity or a subcarrier quantity corresponding to a system bandwidth is merely an example for description, and the communications device may alternatively determine the length of the ZC sequence based on another parameter (such as a comb).

A quantity of ZC sequence groups may be less than a quantity of combinations of parameters for determining a ZC sequence group. For example, a ZC sequence is determined based on a quantity of resource blocks included in a carrier bandwidth or a quantity of subcarriers included in a carrier bandwidth and a comb. A length of the ZC sequence is L, and a root set of the ZC sequence is $Q=[Q(0), Q(1), Q(2), \ldots, Q(Nq-1)]$, where Nq is a quantity of roots. Assuming that there are x quantities of resource blocks included in a carrier bandwidth (similarly, x quantities of subcarriers included in the carrier bandwidth) and y comb values, there are $x*y$ combinations of the quantities and the values. One group of ZC sequences may be determined by using each combination, a length of this group of ZC sequences is L, and a root set of this group of ZC sequences is Q. When some of lengths L of $x*y$ groups of ZC sequences corresponding to the $x*y$ combinations are the same and some of root sets Q of the $x*y$ groups of ZC sequences corresponding to the $x*y$ combinations are the same, an actual quantity of ZC sequence groups is less than $x*y$. In an example in which some of the lengths L of the $x*y$ groups of ZC sequences corresponding to the $x*y$ combinations are the same and some of the root sets Q of the $x*y$ groups of ZC sequences corresponding to the $x*y$ combinations are the same, in a case of the same comb, when the quantity of resource blocks included in the carrier bandwidth does not exceed (or is less than) 100, 102, 104, 105, 106, 108, or 110, one group of ZC sequences is used, a length of this group of ZC sequences is L0, and a root set of this group of ZC sequences is Q0; or when the quantity of resource blocks included in the carrier bandwidth exceeds (or is not less than) 100, 102, 104, 105, 106, 108, or 110, or when the quantity of resource blocks included in the carrier bandwidth exceeds (or is not less than) 100, 102, 104, 105, 106, 108, or 110 and does not exceed 272 or 275, another group of ZC sequences is used, a length of this group of ZC sequences is L1, and a root set of this group of ZC sequences is Q1.

In an example, for an SRS, a comb may be 2 or 4. In this case, there may be four groups of sequences. For example,
when the comb is 2, and the quantity of resource blocks included in the carrier bandwidth does not exceed (or is less than) 100, 102, 104, 105, 106, 108, or 110, that is, when a comb value is a first value and the resource block quantity corresponding to the system bandwidth is less than or equal to a resource block threshold, the communications device uses a group of ZC sequences, the length of this group of ZC sequences is L0, and a root set of this group of ZC sequences is Q0;

when the comb is 2, and the quantity of resource blocks included in the carrier bandwidth exceeds (or is not less than) 100, 102, 104, 105, 106, 108, or 110, or when the quantity of resource blocks included in the carrier bandwidth exceeds (or is not less than) 100, 102, 104, 105, 106, 108, or 110 and does not exceed 272 or 275, another group of ZC sequences is used, the length of this group of ZC sequences is L1, and a root set of this group of ZC sequences is Q1, where all of 100, 102, 104, 105, 106, 108, 110, 272, and 275 are resource block thresholds;

when the comb is 4, and the quantity of resource blocks included in the carrier bandwidth does not exceed (or is less than) 100, 102, 104, 105, 106, 108, or 110, another group of ZC sequences is used, the length of this group of ZC sequences is L2, and the root set of this group of ZC sequences is Q2; and when the comb is 4, and the quantity of resource blocks included in the carrier bandwidth exceeds (or is not less than) 100, 102, 104, 105, 106, 108, or 110, or when the quantity of resource blocks included in the carrier bandwidth exceeds (or is not less than) 100, 102, 104, 105, 106, 108, or 110 and does not exceed 272 or 275, another group of ZC sequences is used, the length of this group of ZC sequences is L3, and the root set of this group of ZC sequences is Q3.

It should be noted that the quantity of resource blocks included in the carrier bandwidth in the foregoing four grouping cases may be equivalently replaced by the quantity of subcarriers included in the carrier bandwidth. A subcarrier value is used to replace a resource block value to represent a corresponding threshold.

It should be noted that there are two ranges for the quantity of resource blocks included in the carrier bandwidth in the foregoing four grouping cases. When a quantity of resource blocks included in a carrier bandwidth in which a user operates falls within one of the two ranges, a group of ZC sequences corresponding to this range is used. Actually, there may be a plurality of ranges for the quantity of resource blocks included in the carrier bandwidth. For example, if there are three ranges, there are six groups of ZC sequences in total based on the comb of 2 or 4.

It should be noted that comb values and the quantities in the foregoing four cases are merely examples. For example, for a DMRS reference signal, a comb value may be 1 or 2. In addition, for different combs, a quantity of ranges for the quantity of resource blocks included in the carrier bandwidth may be different. For example, when an SRS reference signal is used for measuring a direction or the like of a beam, the required measurement accuracy is not very high. Therefore, a sparser comb, for example, a comb value 8, may be used for measurement. In this case, an allocated bandwidth is a multiple of eight RBs, and a quantity of allocatable bandwidths is relatively small. Therefore, no division may need to be performed to obtain ranges for the quantity of resource blocks included in the carrier bandwidth. For instance, when the comb is 8, one group of ZC sequences is used for all carrier bandwidth configurations. The length of this group of ZC sequences is L4, and a root set of this group of ZC sequences is Q4. Therefore, together with the foregoing four groups of sequences in the case of the comb of 2 or 4, there are five groups of sequences in total.

For example, a ZC sequence is determined based on a carrier bandwidth, a subcarrier spacing, and a comb. In this case, a quantity of resource blocks included in the carrier bandwidth or a quantity of subcarriers included in the carrier bandwidth may be obtained by using the carrier bandwidth and the subcarrier spacing, and then, as described above, a group of ZC sequences that is to be used is determined based on the quantity of resource blocks included in the carrier bandwidth or the quantity of subcarriers included in the carrier bandwidth and the comb.

Similarly, in another case, the division may be performed to obtain ranges for a parameter for determining a ZC sequence, so that a quantity of ZC sequence groups is less than a quantity of combinations of parameters for determining a root set of the ZC sequence.

A group of ZC sequences that is to be used may be indicated through implicit indication or signaling addition indication. In the case of implicit indication, after obtaining parameter values of the quantity of resource blocks included in the carrier bandwidth or the quantity of subcarrier included in the carrier bandwidth and the comb, a user may directly select a group of ZC sequences corresponding to the parameter values, where a length of this group of ZC sequences is L and a root set of this group of ZC sequences is Q. In the case of signaling addition indication, for example, if there are four groups of ZC sequences, a base station may use 2-bit (bit) signaling to indicate a group of ZC sequences to be used by a user. The implicit indication and the signaling addition indication may be used in combination. When no signaling indicates a group of ZC sequences that is to be used, the user selects a corresponding group of ZC sequences through implicit indication.

A plurality of groups of ZC sequences are used to reduce a quantity of allocated bandwidths that can be applied to each group of ZC sequences, thereby reducing a length of the ZC sequence to obtain a high cross correlation. For example, a comb is 1 and a comb is 2 for an uplink DMRS reference signal. All allocatable bandwidths of single carriers within 275 RBs correspond to $2^a*3^b*5^c$ RBs, where a≥0, b≥0, and c≥0, and there are 53 types of allocatable bandwidths in total within 275 RBs for each comb. In this case, if only one group of ZC sequences is used, reference signal sequences of all the allocatable bandwidths may be generated by using this group of ZC sequences when the combs are 1 and 2. In this case, the ZC sequence becomes very long in length, and correspondingly, a cross correlation becomes low. However, if one group of ZC sequences is used for each carrier bandwidth and comb configuration, a relatively large quantity of groups of ZC sequences are required. In addition, a difference in lengths of ZC sequences corresponding neighboring carrier bandwidths is not very large, and a difference in cross correlations is unapparent. Therefore, a quantity of ZC sequence groups is less than a quantity of combinations of parameters for determining a root set of a ZC sequence, so that the quantity of ZC sequence groups can be prevented from being excessively large, and a cross correlation is higher than that in a case in which only one group of ZC sequences is used.

In addition, a plurality of groups of ZC sequences are used to further optimize a PAPR and an RCM of a reference signal to which a small bandwidth is allocated, to improve edge coverage. Four RBs of an SRS are used as an example. A PAPR and an RCM of the reference signal are optimized based on an allocated bandwidth of four RBs. When K=2, and K=4 (K represents a comb), lengths of corresponding reference signal sequences are two RBs and one RB. When a plurality of groups of root sets are used, only a reference signal sequence with a length of two RBs needs to be optimized when the comb is 2, and only a reference signal sequence with a length of one RB needs to be optimized when the comb is 4. However, when one group of root sets is used, reference signal sequences with lengths of two RBs and one RB need to be optimized. In this case, it is difficult to find enough roots, or a ZC sequence length required for finding enough roots is very large.

The following describes in detail a ZC sequence generation method provided in this application.

A group of ZC sequences is determined based on at least one parameter in a carrier bandwidth, a quantity of resource blocks included in the carrier bandwidth, a quantity of subcarriers included in the carrier bandwidth, a comb, a subcarrier spacing, and a minimum granularity of resource allocation. A length of the ZC sequence is L, and a root set of the ZC sequence is Q=[Q(0), Q(1), Q(2), ..., Q(Nq−1)], where Nq is a quantity of roots. A reference signal sequence whose allocated bandwidth corresponds to a quantity $N_{rb}$ of resource blocks and a quantity $N_{sc}$ of subcarriers is obtained based on the root set Q=[Q(0), Q(1), Q(2), Q(Nq−1)] of the ZC sequence with the length of L, where $N_{sc}$ is an element in a set $N_{SC}$, $N_{SC}$=[$N_{SC}$(0), $N_{SC}$(1), ..., $N_{SC}$($N_{BW}$−1)] is a subcarrier quantity set corresponding to an allocated bandwidth, $N_{BW}$ is a quantity of allocated bandwidths, $N_{rb}$ is an element in a set $N_{RB}$, and $N_{RB}$=[$N_{RB}$(0), $N_{RB}$(1), ..., $N_{RB}$($N_{BW}$−1)] is a resource block quantity set corresponding to the allocated bandwidth. Apparently, $N_{SC}$=12·$N_{RB}$. The quantity $N_{rb}$ of allocated resource blocks does not exceed the quantity $N_{sc}$ of resource blocks included in the carrier bandwidth, and correspondingly, the quantity $N_{sc}$ of allocated subcarriers does not exceed the quantity of subcarriers included in the carrier bandwidth, or does not exceed a quantity of subcarriers included in a maximum continuous bandwidth (bandwidth part, BP) in which UE can operate. In some examples, the set $N_{RB}$ of the allocated resource blocks may be all allocatable bandwidths that do not exceed the quantity of resource blocks included in the carrier bandwidth.

For example, a ZC sequence is determined based on a quantity of resource blocks included in a carrier bandwidth or a quantity of subcarriers included in a carrier bandwidth and a comb. It is assumed that when the quantity of resource blocks included in the carrier bandwidth does not exceed 100 for a comb, the same group of ZC sequences is used, a length of the ZC sequence is L, and a root set of the ZC sequence is Q. In this case, a resource block set $N_{RB}$ corresponding to a reference signal sequence that may be generated by using the ZC sequence is a set of all allocatable bandwidths that do not exceed the quantity 100 of resource blocks included in the current carrier bandwidth. For an uplink DMRS reference signal, a quantity of allocated resource blocks is $2^a*3^b*5^c$. Therefore, there are 34 types of allocatable bandwidths that do not exceed the 100 RBs. In other words, reference signal sequences with 34 types of different allocated bandwidths may be generated by using this group of ZC sequences whose lengths are L and root sets are Q. It should be noted that the resource block set $N_{RB}$ may be a subset of 34 types of allocated bandwidths. In addition, the set of all the allocatable bandwidths in the current carrier bandwidth is different for different reference signals. An allocatable bandwidth for a DMRS reference signal is described above. For an SRS reference signal sequence, an allocatable bandwidth is a multiple of four RBs, and a corresponding set of allocatable bandwidths is different from that for the DMRS.

For example, a ZC sequence is determined based on a carrier bandwidth, a subcarrier spacing, and a comb. In this case, a quantity of resource blocks included in the carrier bandwidth or a quantity of subcarriers included in the carrier bandwidth may be obtained by using the carrier bandwidth and the subcarrier spacing. A quantity $N_{rb}$ of allocated resource blocks does not exceed the quantity of resource blocks included in the carrier bandwidth.

An example process of generating a ZC sequence is as follows:

A frequency domain reference signal sequence whose allocated bandwidth corresponds to a quantity $N_{rb}$ of resource blocks and a quantity $N_{sc}$ of subcarriers is obtained based on a root set $Q=[Q(0), Q(1), Q(2), \ldots, Q(Nq-1)]$ of a ZC sequence with a length of L, and generation of the frequency domain reference signal sequence is related to a mapped location of the frequency domain reference signal sequence, where $N_{sc}$ is an element in a set $N_{SC}$, $N_{SC}=[N_{SC}(0), N_{SC}(1), \ldots, N_{SC}(N_{BW}-1)]$ is a subcarrier quantity set corresponding to an allocated bandwidth, $N_{BW}$ is a quantity of allocated bandwidths, $N_{rb}$ is an element in a set $N_{RB}$, and $N_{RB}=[N_{RB}(0), N_{RB}(1), \ldots, N_{RB}(N_{BW}-1)]$ is a resource block quantity set corresponding to the allocated bandwidth. A process of generating a frequency domain reference signal sequence is described below.

A set of lengths of reference signal sequences in a case of $N_{BW}$ types of allocated bandwidths is represented as $M=[M(0), M(1), \ldots, M(N_{BW}-1)]$. A length $M_{sc}$ of a reference signal sequence may be obtained based on a quantity $N_{sc}$ of subcarriers corresponding to the allocated bandwidth and a comb, where $M_{sc}$ is an element in the set M. A comb value is K. Therefore, it is easy to know that $M=N_{sc}/K$, that is, $M=[N_{SC}(0)/K, N_{SC}(1)/K, \ldots, N_{SC}(N_{BW}-1)/K]$.

For a subcarrier spacing K of mapped locations of neighboring frequency domain reference signal data and a quantity $N_{sc}$ of subcarriers corresponding to an allocated bandwidth, a ZC sequence $x_q(n)$ with a length of L is generated based on a root q and the ZC sequence length L:

$$x_q(n) = e^{-j\frac{\pi \cdot q \cdot n \cdot (n+1)}{L}}, 0 \leq n \leq L-1 \quad (2)$$

The root q is selected from a root set Q. It should be noted that for a process of selecting a particular root q from the set Q, reference may be made to a manner in LTE. In LTE, for ZC sequences with the same length, selectable roots are classified into 30 groups that are represented by u. Each group includes one or two roots that are referred to as base sequences and are represented by v. In LTE, a user obtains values of u and v to determine a value of a particular root q, to generate a reference signal. If the root set Q includes 30 roots, there are 30 corresponding groups, and each group includes one base sequence. If the root set Q includes 30 roots, there are 30 corresponding groups, and each group includes two base sequences. Therefore, a particular root q may be selected from the root set Q with reference to the manner in LTE to generate a sequence.

A maximum length of the length set M of reference signal sequences is $M(N_{BW}-1)$, and a parent sequence $x_q^{MAX}(n)$ with the length of $M(N_{BW}-1)$ is obtained by using the ZC sequence $x_q(n)$:

$$x_q^{MAX}(n)=x_q(n \bmod L), n=0,1,2,\ldots,M(N_{BW}-1)-1 \quad (3)$$

The parent sequence $x_q^{MAX}(n)$ is multiplied by a corresponding phase factor to obtain a sequence $x_q^{(\alpha)MAX}(n)$:

$$x_q^{(\alpha)MAX}(n)=e^{j\alpha n}x_q^{MAX}(n), n=0, 1, 2, \ldots, M(N_{BW}-1)-1 \quad (4)$$

$\alpha$ is a phase factor of linear phase rotation, may also be referred to as a CS factor, and is a real number.

The length of the reference signal sequence for which the comb value is K and whose allocated bandwidth corresponds to the quantity $N_{sc}$ of subcarriers is $M_{sc}$. A reference signal sequence with the length of $M_{sc}$ may be obtained by using the sequence $x_q^{(\alpha)MAX}(n)$ and based on a mapped location of a frequency domain reference signal, K, and a deviation value $\Delta N$ between an initial location from which the user operates in a carrier bandwidth and an initial location of the carrier bandwidth. Assuming that a mapped initial location of the frequency domain reference signal is $N_{int}$, the frequency domain reference signal sequence r(n) with the length of $M_{sc}$ may be obtained according to the following formula:

$$r(n)=x_q^{(\alpha)MAX}(\lfloor (N_{int}+\Delta N+n)/K \rfloor), n=0, 1, 2, \ldots, M_{sc}-1 \quad (5)$$

In the foregoing formula, it is assumed that an initial subcarrier location corresponding to a maximum allocated bandwidth resource is 0. For example, the maximum bandwidth is 100 RBs, and mapped locations of the frequency domain reference signal are $0, 1, 2, \ldots$, and 1199. When $K=2$, a minimum initial location may be 0 or 1; or when $K=4$, a minimum initial location may be 0, 1, 2, or 3.

It should be noted that a mapped location of a frequency domain reference signal is a location to which a user maps a resource in a BP bandwidth. The user operates in a carrier bandwidth, and the BP bandwidth of the user may be less than the carrier bandwidth. $\Delta N$ is a deviation value between an initial location from which the user operates in the carrier bandwidth and an initial location of the carrier bandwidth. For example, a BP bandwidth of 5 M is 25 RBs, and the user accesses a carrier bandwidth of 20 M, that is, 100 RBs. An initial subcarrier location of the carrier bandwidth is set to 0, and subcarrier locations of the carrier bandwidth of 100 RBs are $0, 1, 2, \ldots$, and 1199. An initial location from which the user accesses the carrier bandwidth is 300, in other words, the user whose BP bandwidth is 25 RBs operates on subcarriers at locations of $300, 301, \ldots$, and 599 in the carrier bandwidth, and correspondingly, $\Delta N=300-0=300$.

The frequency domain reference signal sequence with the length of $M_{sc}$ is obtained according to the formula (5). Then the frequency domain reference signal sequence may be mapped to a frequency domain resource allocated to the frequency domain reference signal reference, and a reference signal is sent through operations such as inverse discrete Fourier transform (IFFT) and addition of a cyclic prefix (CP).

Figure 3:
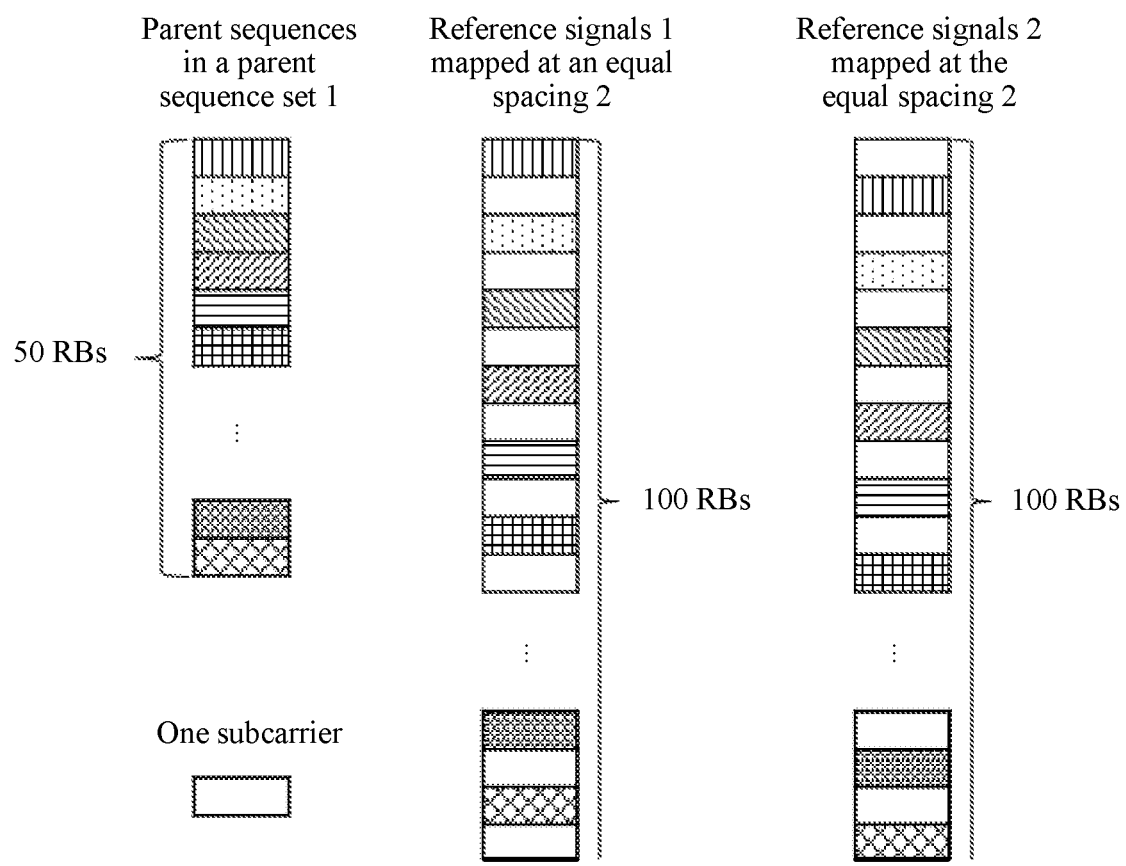
FIG. 3 is a schematic diagram of a correspondence between a frequency domain reference signal sequence r(n) and a parent sequence and mapped locations according to this application.
Figure 4:
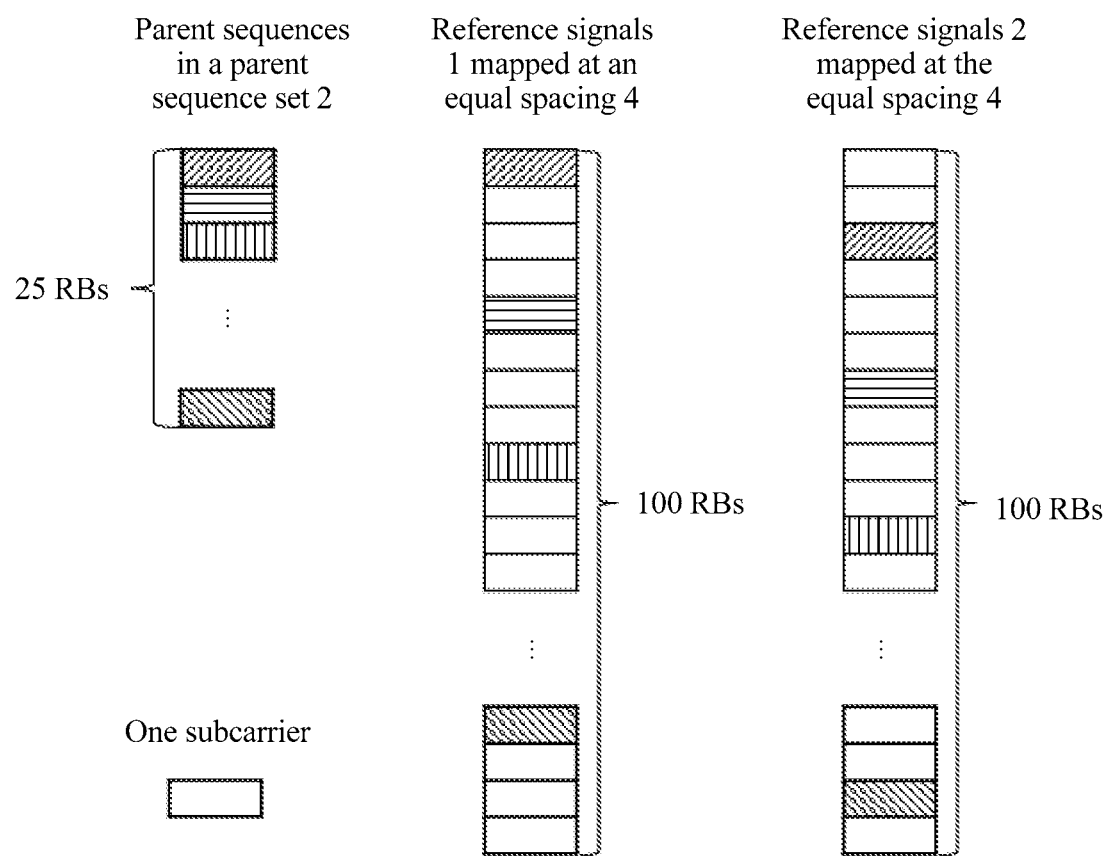
FIG. 4 is another schematic diagram of a correspondence between a frequency domain reference signal sequence r(n) and a parent sequence and mapped locations according to this application.

Correspondences between a frequency domain reference signal sequence r(n) and a parent sequence and mapped locations are shown in FIG. 3 and FIG. 4. In FIG. 3 and FIG. 4, blank blocks represent subcarriers carrying non-reference signals, and the other blocks represent subcarriers carrying reference signals. The parent sequence in FIG. 3 may be $x_q^{MAX}(n)$ or $x_q^{(\alpha)MAX}(n)$. When the parent sequence is $x_q^{MAX}(n)$, a frequency domain reference sequence with a length of $M_{sc}$ is first obtained based on the parent sequence $x_q^{MAX}(n)$ according to the formula (5), then the frequency domain reference sequence is multiplied by a corresponding phase factor, and then frequency domain resource mapping is performed. In FIG. 3, for example, a maximum allocated bandwidth is 100 RBs and $K=2$. A maximum length of a corresponding frequency domain reference signal sequence is 600 subcarriers, that is, a length of $x_q^{(\alpha)MAX}(n)$ is 600. Assuming that an allocated bandwidth is four RBs, $\Delta N=0$, and an initial location $N_{int}$ is 0, in other words, mapped locations are $0, 2, 4, \ldots$, and 94, it may be determined, according to the formula (5), that a reference signal sequence r(n) with a length of 48 is $x_q^{(\alpha)MAX}(0), x_q^{(\alpha)MAX}(1), \ldots, x_q^{(\alpha)MAX}(47)$. Assuming that an initial location $N_{int}$ is 48 (four RBs), in other words, mapped locations are 48, 50, 52, ..., and 142, it may be determined, according to the formula (5), that a reference signal sequence r(n) with a length of 48 is $x_q^{(\alpha)MAX}(24)$, $x_q^{(\alpha)MAX}(25)$, ..., $x_q^{(\alpha)MAX}(71)$. In FIG. 4, for example, the maximum allocated bandwidth is 100 RBs and K=4. The maximum length of a corresponding frequency domain reference signal sequence is 300 subcarriers, that is, the length of $x_q^{(\alpha)MAX}(n)$ is 300. Assuming that an allocated bandwidth is four RBs, $\Delta N=0$, and an initial location $N_{int}$ is 0, in other words, mapped locations are 0, 4, 8, ..., and 92, it may be determined, according to the formula (5), that a reference signal sequence r(n) with a length of 24 is $x_q^{(\alpha)MAX}(0)$, $x_q^{(\alpha)MAX}(1)$, ..., $x_q^{(\alpha)MAX}(23)$. Assuming that an initial location $N_{int}$ is 48 (four RBs), in other words, mapped locations are 48, 52, 56, ..., and 140, it may be determined, according to the formula (5), that a reference signal sequence r(n) with a length of 48 is $x_q^{(\alpha)MAX}(12)$, $x_q^{(\alpha)MAX}(13)$, ..., $x_q^{(\alpha)MAX}(35)$.

In the foregoing description, a parent sequence is generated by using a ZC sequence $x_q(n)$, and then a reference signal sequence with a corresponding length is obtained by using the parent sequence. Equivalently, a reference signal sequence with a length of $M_{sc}$ may be directly obtained by using $x_q(n)$ based on a mapped location of a frequency domain reference signal and a mapped subcarrier spacing K. Assuming that a mapped initial location of the frequency domain reference signal is $N_{int}$, the frequency domain reference signal r(n) with the length of $M_{sc}$ may be obtained according to the following formula:

$$r(n)=x_q(\lfloor (N_{int}+\Delta N+n)/K \rfloor \bmod L), n=0, 1, 2, \ldots, M_{sc}-1 \quad (6)$$

In the foregoing description, ZC sequences $x_q(n)$ corresponding to all roots generated from a root set, parent sequences $x_q^{MAX}(n)$ corresponding to all roots, or sequences $x_q^{(\alpha)MAX}(n)$ that correspond to all roots and that are obtained after phase rotation can be directly stored on storage resources of a transmitting end, and $x_q(n)$, $x_q^{MAX}(n)$, or $x_q^{(\alpha)MAX}(n)$ corresponding to a root is directly read for use.

When a resource block quantity or a subcarrier quantity corresponding to a system bandwidth is less than or equal to a resource block threshold, a length of a ZC sequence and a root set corresponding to the ZC sequence are one of the following:

(1) A comb value K is 1.

In an implementation, the length of the ZC sequence is 2621, and values of roots q are some or all of the following values: 133, 135, 140, 148, 157, 167, 178, 206, 211, 213, 301, 317, 340, 386, 391, 450, 451, 487, 488, 509, 574, 614, 692, 693, 695, 696, 736, 773, 802, 815, 822, 823, 962, 991, 993, 1000, 1003, 1083, 1216, 1236, 1237, 1384, 1385, 1405, 1538, 1618, 1621, 1628, 1630, 1659, 1798, 1799, 1806, 1819, 1848, 1885, 1925, 1926, 1928, 1929, 2007, 2047, 2112, 2133, 2134, 2170, 2171, 2230, 2235, 2281, 2304, 2320, 2408, 2410, 2415, 2443, 2454, 2464, 2473, 2481, 2486, and 2488.

In another implementation, the length of the ZC sequence is 3583, and values of roots q are some or all of the following values: 204, 218, 268, 292, 306, 314, 412, 426, 535, 561, 569, 629, 636, 642, 695, 759, 785, 818, 835, 963, 984, 999, 1058, 1060, 1064, 1088, 1261, 1355, 1357, 1358, 1371, 1479, 1512, 1560, 1667, 1691, 1892, 1916, 2023, 2071, 2104, 2212, 2225, 2226, 2228, 2322, 2495, 2519, 2523, 2525, 2584, 2599, 2620, 2748, 2765, 2798, 2824, 2888, 2941, 2947, 2954, 3014, 3022, 3048, 3157, 3171, 3269, 3277, 3291, 3315, 3365, and 3379.

In another implementation, the length of the ZC sequence is 7717, and values of roots q are some or all of the following values: 400, 443, 446, 495, 563, 580, 678, 687, 688, 729, 741, 795, 922, 1013, 1199, 1203, 1370, 1458, 1644, 1746, 2283, 2356, 2387, 2403, 2420, 2822, 2861, 2953, 3488, 3575, 4142, 4229, 4764, 4856, 4895, 5297, 5314, 5330, 5361, 5434, 5971, 6073, 6259, 6347, 6514, 6518, 6704, 6795, 6922, 6976, 6988, 7029, 7030, 7039, 7137, 7154, 7222, 7271, 7274, and 7317.

In another implementation, the length of the ZC sequence is 2851, and values of roots q are some or all of the following values: 185, 208, 242, 246, 277, 294, 302, 642, 882, 1053, 1058, 1304, 1305, 1309, 1322, 1529, 1542, 1546, 1547, 1793, 1798, 1969, 2209, 2549, 2557, 2574, 2605, 2609, 2643, and 2666.

In another implementation, the length of the ZC sequence is 3733, and values of roots q are some or all of the following values: 259, 261, 279, 294, 321, 349, 360, 384, 401, 1346, 1378, 1379, 1690, 1705, 1714, 2019, 2028, 2043, 2354, 2355, 2387, 3332, 3349, 3373, 3384, 3412, 3439, 3454, 3472, and 3474.

In another implementation, the length of the ZC sequence is 7717, and values of roots q are some or all of the following values: 495, 563, 580, 678, 687, 688, 729, 741, 795, 1746, 2356, 2387, 2822, 2861, 3488, 3575, 4142, 4229, 4856, 4895, 5330, 5361, 5971, 6922, 6976, 6988, 7029, 7030, 7039, 7137, 7154, and 7222.

(2) A comb value K is 2.

In an implementation, the length of the ZC sequence is 1787, and values of roots q are some or all of the following values: 44, 61, 125, 133, 144, 157, 174, 175, 207, 213, 241, 277, 284, 287, 307, 313, 333, 337, 373, 381, 403, 409, 416, 428, 430, 464, 465, 467, 469, 491, 494, 499, 520, 530, 540, 545, 562, 575, 577, 579, 635, 660, 677, 684, 730, 740, 742, 750, 775, 780, 784, 787, 788, 803, 809, 820, 827, 836, 839, 856, 931, 948, 951, 960, 967, 978, 984, 999, 1000, 1003, 1007, 1012, 1037, 1045, 1047, 1057, 1103, 1110, 1127, 1152, 1208, 1210, 1212, 1225, 1242, 1247, 1257, 1267, 1288, 1293, 1296, 1318, 1320, 1322, 1323, 1357, 1359, 1371, 1378, 1384, 1406, 1414, 1450, 1454, 1474, 1480, 1500, 1503, 1510, 1546, 1574, 1580, 1612, 1613, 1630, 1643, 1654, 1662, 1726, and 1743.

In another implementation, the length of the ZC sequence is 2377, and values of roots q are some or all of the following values: 57, 60, 76, 89, 90, 100, 102, 107, 111, 167, 179, 192, 195, 202, 203, 222, 273, 276, 284, 322, 362, 372, 377, 411, 437, 448, 451, 491, 499, 539, 545, 569, 612, 615, 631, 658, 663, 668, 719, 721, 725, 727, 728, 737, 739, 753, 759, 766, 825, 836, 882, 901, 910, 921, 926, 935, 965, 987, 1044, 1088, 1101, 1102, 1113, 1115, 1121, 1122, 1154, 1223, 1255, 1256, 1262, 1264, 1275, 1276, 1289, 1333, 1390, 1412, 1442, 1451, 1456, 1467, 1476, 1495, 1541, 1552, 1611, 1618, 1624, 1638, 1640, 1649, 1650, 1652, 1656, 1658, 1709, 1714, 1719, 1746, 1762, 1765, 1808, 1832, 1838, 1878, 1886, 1926, 1929, 1940, 1966, 2000, 2005, 2015, 2055, 2093, 2101, 2104, 2155, 2174, 2175, 2182, 2185, 2198, 2210, 2266, 2270, 2275, 2277, 2287, 2288, 2301, 2317, and 2320.

In another implementation, the length of the ZC sequence is 4549, and values of roots q are some or all of the following values: 112, 131, 135, 139, 173, 179, 184, 263, 272, 318, 362, 372, 385, 443, 489, 597, 618, 713, 714, 721, 797, 859, 879, 953, 967, 1026, 1041, 1043, 1057, 1100, 1104, 1250, 1278, 1376, 1410, 1416, 1431, 1571, 1572, 1585, 1586, 1601, 1618, 1634, 1644, 1724, 1738, 1755, 1867, 1885, 2004, 2110, 2114, 2115, 2118, 2147, 2170, 2173, 2214, 2217, 2332, 2335, 2376, 2379, 2402, 2431, 2434, 2435, 2439, 2545, 2664, 2682, 2794, 2811, 2825, 2905, 2915, 2931, 2948, 2963, 2964, 2977, 2978, 3118, 3133, 3139, 3173, 3271, 3299, 3445, 3449, 3492, 3506, 3508, 3523, 3582, 3596, 3670, 3690, 3752, 3828, 3835, 3836, 3931, 3952, 4060, 4106, 4164, 4177, 4187, 4231, 4277, 4286, 4365, 4370, 4376, 4410, 4414, 4418, and 4437.

In another implementation, the length of the ZC sequence is 1931, and values of roots q are some or all of the following values: 50, 53, 58, 59, 65, 70, 89, 98, 132, 134, 135, 141, 144, 146, 151, 152, 164, 166, 171, 178, 179, 186, 231, 267, 337, 339, 346, 348, 355, 359, 364, 369, 375, 399, 401, 417, 418, 421, 450, 462, 467, 507, 517, 601, 611, 616, 707, 709, 740, 753, 760, 785, 815, 843, 865, 881, 889, 906, 913, 925, 926, 937, 994, 1005, 1006, 1018, 1025, 1042, 1050, 1066, 1088, 1116, 1146, 1171, 1178, 1191, 1222, 1224, 1315, 1320, 1330, 1414, 1424, 1464, 1469, 1481, 1510, 1513, 1514, 1530, 1532, 1556, 1562, 1567, 1572, 1576, 1583, 1585, 1592, 1594, 1664, 1700, 1745, 1752, 1753, 1760, 1765, 1767, 1779, 1780, 1785, 1787, 1790, 1796, 1797, 1799, 1833, 1842, 1861, 1866, 1872, 1873, 1878, and 1881.

In another implementation, the length of the ZC sequence is 2621, and values of roots q are some or all of the following values: 62, 74, 83, 95, 96, 102, 133, 135, 148, 149, 157, 160, 167, 193, 211, 213, 270, 301, 339, 340, 451, 487, 488, 508, 574, 608, 609, 610, 619, 637, 693, 696, 736, 773, 775, 791, 792, 803, 822, 823, 841, 847, 898, 916, 920, 940, 962, 991, 993, 1000, 1003, 1024, 1137, 1144, 1185, 1188, 1236, 1237, 1255, 1263, 1358, 1366, 1384, 1385, 1433, 1436, 1477, 1484, 1597, 1618, 1621, 1628, 1630, 1659, 1681, 1701, 1705, 1723, 1774, 1780, 1798, 1799, 1818, 1829, 1830, 1846, 1848, 1885, 1925, 1928, 1984, 2002, 2011, 2012, 2013, 2047, 2113, 2133, 2134, 2170, 2281, 2282, 2320, 2351, 2408, 2410, 2428, 2454, 2461, 2464, 2472, 2473, 2486, 2488, 2519, 2525, 2526, 2538, 2547, and 2559.

In another implementation, the length of the ZC sequence is 4561, and values of roots q are some or all of the following values: 112, 121, 133, 140, 154, 202, 213, 264, 273, 298, 312, 340, 406, 425, 438, 443, 470, 592, 603, 631, 674, 689, 707, 728, 791, 816, 839, 860, 862, 871, 875, 879, 948, 952, 954, 1180, 1206, 1223, 1376, 1386, 1430, 1454, 1576, 1577, 1583, 1584, 1594, 1648, 1671, 1693, 1728, 1748, 1760, 1787, 1788, 1790, 1910, 1932, 1985, 2061, 2067, 2084, 2151, 2155, 2176, 2385, 2406, 2410, 2477, 2494, 2500, 2576, 2629, 2651, 2771, 2773, 2774, 2801, 2813, 2833, 2868, 2890, 2913, 2967, 2977, 2978, 2984, 2985, 3107, 3131, 3175, 3185, 3338, 3355, 3381, 3607, 3609, 3613, 3682, 3686, 3690, 3699, 3701, 3722, 3745, 3770, 3833, 3854, 3872, 3887, 3930, 3958, 3969, 4091, 4118, 4123, 4136, 4155, 4221, 4249, 4263, 4288, 4297, 4348, 4359, 4407, 4421, 4428, 4440, and 4449.

In another implementation, the length of the ZC sequence is 1489, and values of roots q are some or all of the following values: 46, 56, 61, 66, 69, 108, 111, 121, 127, 128, 131, 171, 206, 222, 227, 233, 236, 274, 321, 323, 337, 347, 391, 403, 433, 463, 464, 475, 511, 514, 552, 569, 575, 623, 624, 646, 650, 654, 667, 692, 714, 716, 720, 725, 726, 763, 764, 769, 773, 775, 797, 822, 835, 839, 843, 865, 866, 914, 920, 937, 975, 978, 1014, 1025, 1026, 1056, 1086, 1098, 1142, 1152, 1166, 1168, 1215, 1253, 1256, 1262, 1267, 1283, 1318, 1358, 1361, 1362, 1368, 1378, 1381, 1420, 1423, 1428, 1433, and 1443.

In another implementation, the length of the ZC sequence is 1721, and values of roots q are some or all of the following values: 46, 47, 50, 55, 70, 79, 92, 98, 103, 117, 140, 146, 147, 154, 167, 185, 204, 221, 233, 236, 257, 296, 321, 357, 388, 400, 403, 414, 416, 450, 473, 481, 542, 549, 559, 595, 605, 635, 652, 729, 745, 749, 758, 788, 838, 883, 933, 963, 972, 976, 992, 1069, 1086, 1116, 1126, 1162, 1172, 1179, 1240, 1248, 1271, 1305, 1307, 1318, 1321, 1333, 1364, 1400, 1425, 1464, 1485, 1488, 1500, 1517, 1536, 1554, 1567, 1574, 1575, 1581, 1604, 1618, 1623, 1629, 1642, 1651, 1666, 1671, 1674, and 1675.

In another implementation, the length of the ZC sequence is 3109, and values of roots q are some or all of the following values: 77, 81, 95, 98, 121, 123, 137, 146, 151, 227, 247, 250, 251, 275, 361, 375, 376, 408, 411, 422, 459, 469, 472, 500, 535, 595, 603, 649, 853, 1009, 1065, 1071, 1084, 1121, 1126, 1178, 1206, 1265, 1276, 1301, 1357, 1364, 1403, 1423, 1475, 1502, 1607, 1634, 1686, 1706, 1745, 1752, 1808, 1833, 1844, 1903, 1931, 1983, 1988, 2025, 2038, 2044, 2100, 2256, 2460, 2506, 2514, 2574, 2609, 2637, 2640, 2650, 2687, 2698, 2701, 2733, 2734, 2748, 2834, 2858, 2859, 2862, 2882, 2958, 2963, 2972, 2986, 2988, 3011, 3014, 3028, and 3032.

In another implementation, the length of the ZC sequence is 3691, and values of roots q are some or all of the following values: 126, 162, 165, 171, 174, 431, 500, 501, 585, 640, 644, 712, 765, 775, 872, 873, 882, 884, 889, 954, 959, 1032, 1081, 1171, 1172, 1189, 1271, 1274, 1280, 1282, 1296, 1299, 1362, 1404, 1447, 1506, 1559, 1659, 1752, 1755, 1760, 1761, 1770, 1775, 1780, 1787, 1904, 1911, 1916, 1921, 1930, 1931, 1936, 1939, 2032, 2132, 2185, 2244, 2287, 2329, 2392, 2395, 2409, 2411, 2417, 2420, 2502, 2519, 2520, 2610, 2659, 2732, 2737, 2802, 2807, 2809, 2818, 2819, 2916, 2926, 2979, 3047, 3051, 3106, 3190, 3191, 3260, 3517, 3520, 3526, 3529, and 3565.

In another implementation, the length of the ZC sequence is 4931, and values of roots q are some or all of the following values: 166, 187, 194, 202, 203, 208, 211, 217, 218, 220, 227, 239, 243, 250, 576, 586, 735, 737, 787, 791, 855, 932, 934, 945, 946, 1024, 1033, 1177, 1181, 1283, 1377, 1444, 1561, 1573, 1581, 1583, 1698, 1702, 1704, 1718, 1820, 2015, 2084, 2345, 2361, 2362, 2376, 2378, 2389, 2542, 2553, 2555, 2569, 2570, 2586, 2847, 2916, 3111, 3213, 3227, 3229, 3233, 3348, 3350, 3358, 3370, 3487, 3554, 3648, 3750, 3754, 3898, 3907, 3985, 3986, 3997, 3999, 4076, 4140, 4144, 4194, 4196, 4345, 4355, 4681, 4688, 4692, 4704, 4711, 4713, 4714, 4720, 4723, 4728, 4729, 4737, 4744, and 4765.

In another implementation, the length of the ZC sequence is 8689, and values of roots q are some or all of the following values: 260, 268, 283, 286, 287, 329, 338, 371, 373, 400, 408, 1015, 1168, 1179, 1646, 1806, 1817, 2053, 2055, 2056, 2064, 2074, 2248, 2272, 2274, 2426, 2771, 2788, 3003, 3035, 3058, 3213, 3389, 3396, 3409, 3670, 3672, 3789, 4109, 4132, 4142, 4152, 4180, 4187, 4208, 4481, 4502, 4509, 4537, 4547, 4557, 4580, 4900, 5017, 5019, 5280, 5293, 5300, 5476, 5631, 5654, 5686, 5901, 5918, 6263, 6415, 6417, 6441, 6615, 6625, 6633, 6634, 6636, 6872, 6883, 7043, 7510, 7521, 7674, 8281, 8289, 8316, 8318, 8351, 8360, 8402, 8403, 8406, 8421, and 8429.

In another implementation, the length of the ZC sequence is 1553, and values of roots q are some or all of the following values: 44, 49, 75, 80, 85, 102, 122, 127, 134, 136, 181, 213, 229, 269, 279, 285, 290, 295, 297, 298, 301, 326, 339, 372, 374, 404, 433, 469, 496, 500, 531, 533, 539, 553, 557, 562, 569, 570, 605, 607, 684, 741, 749, 751, 756, 757, 796, 797, 802, 804, 812, 869, 946, 948, 983, 984, 991, 996, 1000, 1014, 1020, 1022, 1053, 1057, 1084, 1120, 1149, 1179, 1181, 1214, 1227, 1252, 1255, 1256, 1258, 1263, 1268, 1274, 1284, 1324, 1340, 1372, 1417, 1419, 1426, 1431, 1451, 1468, 1473, 1478, 1504, and 1509.

In another implementation, the length of the ZC sequence is 1931, and values of roots q are some or all of the following values: 50, 58, 59, 65, 70, 89, 98, 134, 135, 141, 144, 146, 152, 171, 172, 178, 179, 231, 267, 337, 339, 348, 355, 359, 375, 399, 401, 417, 421, 450, 467, 507, 517, 601, 611, 616, 740, 753, 815, 843, 865, 906, 913, 925, 926, 1005, 1006, 1018, 1025, 1066, 1088, 1116, 1178, 1191, 1315, 1320, 1330, 1414, 1424, 1464, 1481, 1510, 1514, 1530, 1532, 1556, 1572, 1576, 1583, 1592, 1594, 1664, 1700, 1752, 1753, 1759, 1760, 1779, 1785, 1787, 1790, 1796, 1797, 1833, 1842, 1861, 1866, 1872, 1873, and 1881.

In another implementation, the length of the ZC sequence is 3299, and values of roots q are some or all of the following values: 81, 84, 95, 119, 152, 160, 171, 201, 343, 355, 379, 383, 533, 578, 626, 630, 631, 633, 744, 850, 890, 920, 976, 979, 1002, 1006, 1069, 1073, 1130, 1135, 1140, 1145, 1185, 1192, 1195, 1223, 1264, 1341, 1385, 1449, 1509, 1514, 1518, 1536, 1587, 1712, 1763, 1781, 1785, 1790, 1850, 1914, 1958, 2035, 2076, 2104, 2107, 2114, 2154, 2159, 2164, 2169, 2226, 2230, 2293, 2297, 2320, 2323, 2379, 2409, 2449, 2555, 2666, 2668, 2669, 2673, 2721, 2766, 2916, 2920, 2944, 2956, 3098, 3128, 3139, 3147, 3180, 3204, 3215, and 3218.

In another implementation, the length of the ZC sequence is 2203, and values of roots q are some or all of the following values: 227, 230, 234, 237, 253, 285, 303, 351, 381, 382, 392, 416, 421, 469, 480, 499, 504, 512, 578, 585, 594, 596, 609, 669, 674, 683, 693, 794, 796, 833, 843, 905, 913, 954, 961, 966, 1237, 1242, 1249, 1290, 1298, 1360, 1370, 1407, 1409, 1510, 1520, 1529, 1534, 1594, 1607, 1609, 1618, 1625, 1691, 1699, 1704, 1723, 1734, 1782, 1787, 1811, 1821, 1822, 1852, 1900, 1918, 1950, 1966, 1969, 1973, and 1976.

In another implementation, the length of the ZC sequence is 3457, and values of roots q are some or all of the following values: 367, 372, 396, 418, 474, 541, 604, 613, 614, 636, 639, 656, 929, 932, 935, 1022, 1026, 1225, 1228, 1230, 1231, 1246, 1276, 1277, 1282, 1315, 1335, 1419, 1432, 1459, 1998, 2025, 2038, 2122, 2142, 2175, 2180, 2181, 2211, 2226, 2227, 2229, 2232, 2431, 2435, 2522, 2525, 2528, 2801, 2818, 2821, 2843, 2844, 2853, 2916, 2983, 3039, 3061, 3085, and 3090.

In another implementation, the length of the ZC sequence is 7559, and values of roots q are some or all of the following values: 803, 876, 880, 881, 883, 902, 903, 979, 1020, 1024, 1035, 1143, 1147, 1183, 1307, 1327, 1358, 1648, 1725, 1730, 1761, 2003, 2030, 2045, 2082, 2214, 2892, 3088, 3121, 3188, 3322, 4237, 4371, 4438, 4471, 4667, 5345, 5477, 5514, 5529, 5556, 5798, 5829, 5834, 5911, 6201, 6232, 6252, 6376, 6412, 6416, 6524, 6535, 6539, 6580, 6656, 6657, 6676, 6678, 6679, 6683, and 6756.

In another implementation, the length of the ZC sequence is 1013, and values of roots q are some or all of the following values: 33, 41, 89, 99, 154, 159, 182, 191, 232, 236, 260, 261, 266, 269, 279, 299, 315, 319, 321, 370, 383, 393, 411, 429, 441, 445, 474, 478, 479, 483, 530, 534, 535, 539, 568, 572, 584, 602, 620, 630, 643, 692, 694, 698, 714, 734, 744, 747, 752, 753, 777, 781, 822, 831, 854, 859, 914, 924, 972, and 980.

In another implementation, the length of the ZC sequence is 1103, and values of roots q are some or all of the following values: 31, 56, 59, 75, 80, 97, 103, 108, 131, 133, 142, 264, 285, 308, 321, 323, 349, 380, 391, 392, 407, 426, 458, 462, 479, 484, 494, 503, 504, 506, 507, 596, 597, 599, 600, 609, 619, 624, 641, 645, 677, 696, 711, 712, 723, 754, 780, 782, 795, 818, 839, 961, 970, 972, 995, 1000, 1006, 1023, 1028, 1044, 1047, and 1072.

In another implementation, the length of the ZC sequence is 2273, and values of roots q are some or all of the following values: 56, 80, 83, 92, 100, 112, 159, 171, 264, 274, 424, 435, 484, 529, 537, 594, 596, 661, 715, 817, 830, 843, 894, 922, 927, 933, 984, 999, 1021, 1053, 1220, 1252, 1274, 1289, 1340, 1346, 1351, 1379, 1430, 1443, 1456, 1558, 1612, 1677, 1679, 1736, 1744, 1789, 1838, 1849, 1999, 2009, 2102, 2114, 2161, 2173, 2181, 2190, 2193, and 2217.

In another implementation, the length of the ZC sequence is 2677, and values of roots q are some or all of the following values: 88, 91, 115, 124, 312, 360, 399, 508, 513, 517, 561, 562, 636, 647, 693, 843, 847, 853, 859, 924, 925, 935, 939, 989, 1166, 1266, 1270, 1271, 1277, 1278, 1291, 1386, 1399, 1400, 1406, 1407, 1411, 1511, 1688, 1738, 1742, 1752, 1753, 1818, 1824, 1830, 1834, 1984, 2030, 2041, 2115, 2116, 2160, 2164, 2169, 2278, 2317, 2365, 2553, 2562, 2586, and 2589.

In another implementation, the length of the ZC sequence is 2699, and values of roots q are some or all of the following values: 86, 95, 101, 105, 121, 124, 126, 133, 322, 364, 403, 468, 471, 509, 561, 645, 646, 650, 849, 850, 854, 855, 857, 860, 941, 949, 997, 1026, 1102, 1287, 1301, 1302, 1397, 1398, 1412, 1597, 1673, 1702, 1750, 1758, 1839, 1842, 1844, 1845, 1849, 1850, 2049, 2053, 2054, 2138, 2190, 2228, 2231, 2296, 2335, 2377, 2566, 2573, 2575, 2578, 2594, 2598, 2604, and 2613.

In another implementation, the length of the ZC sequence is 4931, and values of roots q are some or all of the following values: 166, 202, 208, 211, 217, 218, 220, 227, 239, 243, 250, 576, 791, 932, 945, 946, 1033, 1177, 1181, 1283, 1377, 1444, 1561, 1573, 1704, 1718, 2084, 2345, 2361, 2362, 2378, 2553, 2569, 2570, 2586, 2847, 3213, 3227, 3358, 3370, 3487, 3554, 3648, 3750, 3754, 3898, 3985, 3986, 3999, 4140, 4355, 4681, 4688, 4692, 4704, 4711, 4713, 4714, 4720, 4723, 4729, and 4765.

In another implementation, the length of the ZC sequence is 1091, and values of roots q are some or all of the following values: 29, 36, 40, 48, 70, 82, 106, 132, 147, 151, 171, 196, 207, 225, 254, 259, 337, 384, 415, 418, 421, 425, 429, 451, 453, 458, 460, 490, 508, 532, 559, 583, 601, 631, 633, 638, 640, 662, 666, 670, 673, 676, 707, 754, 832, 837, 866, 884, 895, 920, 940, 944, 959, 985, 1009, 1021, 1043, 1051, 1055, and 1062.

In another implementation, the length of the ZC sequence is 1427, and values of roots q are some or all of the following values: 39, 78, 99, 105, 122, 132, 147, 254, 296, 298, 304, 341, 374, 399, 401, 417, 431, 435, 437, 512, 513, 524, 527, 542, 552, 582, 592, 644, 656, 664, 763, 771, 783, 835, 845, 875, 885, 900, 903, 914, 915, 990, 992, 996, 1010, 1026, 1028, 1053, 1086, 1123, 1129, 1131, 1173, 1280, 1295, 1305, 1322, 1328, 1349, and 1388.

In another implementation, the length of the ZC sequence is 2309, and values of roots q are some or all of the following values: 76, 106, 107, 147, 157, 174, 186, 411, 415, 430, 476, 477, 482, 500, 523, 593, 606, 639, 719, 725, 741, 751, 830, 846, 877, 891, 909, 946, 1036, 1045, 1071, 1238, 1264, 1273, 1363, 1400, 1418, 1432, 1463, 1479, 1558, 1568, 1584, 1590, 1670, 1703, 1716, 1786, 1809, 1827, 1832, 1833, 1879, 1894, 1898, 2123, 2135, 2152, 2162, 2202, 2203, and 2233.

In another implementation, the length of the ZC sequence is 1579, and values of roots q are some or all of the following values: 213, 217, 251, 280, 294, 344, 346, 356, 358, 360, 368, 597, 605, 644, 652, 654, 666, 913, 925, 927, 935, 974, 982, 1211, 1219, 1221, 1223, 1233, 1235, 1285, 1299, 1328, 1362, and 1366.

In another implementation, the length of the ZC sequence is 2687, and values of roots q are some or all of the following values: 346, 348, 364, 406, 408, 419, 466, 494, 587, 626, 1018, 1022, 1028, 1103, 1113, 1574, 1584, 1659, 1665, 1669, 2061, 2100, 2193, 2221, 2268, 2279, 2281, 2323, 2339, and 2341.

In another implementation, the length of the ZC sequence is 6473, and values of roots q are some or all of the following values: 965, 1013, 1016, 1160, 1163, 1237, 1242, 1375, 1376, 1413, 1508, 2461, 2462, 2477, 2643, 2675, 2685, 3788, 3798, 3830, 3996, 4011, 4012, 4965, 5060, 5097, 5098, 5231, 5236, 5310, 5313, 5457, 5460, and 5508.

In another implementation, the length of the ZC sequence is 1093, and values of roots q are some or all of the following values: 35, 43, 48, 49, 147, 206, 263, 346, 349, 379, 417, 426, 449, 519, 521, 528, 565, 572, 574, 644, 667, 676, 714, 744, 747, 830, 887, 946, 1044, 1045, 1050, and 1058.

In another implementation, the length of the ZC sequence is 1549, and values of roots q are some or all of the following values: 48, 58, 63, 76, 246, 272, 324, 325, 371, 401, 405, 406, 538, 591, 735, 747, 750, 799, 802, 814, 958, 1011, 1143, 1144, 1148, 1178, 1224, 1225, 1277, 1303, 1473, 1486, 1491, and 1501.

In another implementation, the length of the ZC sequence is 2557, and values of roots q are some or all of the following values: 90, 126, 303, 448, 449, 607, 664, 815, 817, 824, 899, 972, 1079, 1115, 1116, 1221, 1229, 1328, 1336, 1441, 1442, 1478, 1585, 1658, 1733, 1740, 1742, 1893, 1950, 2108, 2109, 2254, 2431, and 2467.

(3) A comb value K is 4.

In an implementation, the length of the ZC sequence is 1741, and values of roots q are some or all of the following values: 99, 100, 105, 107, 119, 122, 127, 137, 138, 140, 154, 155, 181, 185, 200, 202, 207, 208, 210, 224, 226, 234, 257, 260, 280, 312, 320, 333, 334, 338, 377, 404, 470, 471, 506, 507, 526, 527, 529, 531, 541, 546, 630, 639, 643, 646, 665, 667, 708, 710, 711, 731, 755, 760, 764, 767, 785, 797, 799, 810, 821, 920, 931, 942, 944, 956, 974, 977, 981, 986, 1010, 1030, 1031, 1033, 1074, 1076, 1095, 1098, 1102, 1111, 1195, 1200, 1210, 1212, 1214, 1215, 1234, 1235, 1270, 1271, 1337, 1364, 1403, 1407, 1408, 1421, 1429, 1461, 1481, 1484, 1507, 1515, 1517, 1531, 1533, 1534, 1539, 1541, 1556, 1560, 1586, 1587, 1601, 1603, 1604, 1614, 1619, 1622, 1634, 1636, 1641, and 1642.

In another implementation, the length of the ZC sequence is 2381, and values of roots q are some or all of the following values: 137, 145, 151, 162, 179, 221, 253, 278, 283, 287, 308, 326, 351, 355, 370, 382, 383, 416, 423, 426, 438, 442, 449, 451, 455, 507, 537, 631, 632, 644, 654, 664, 668, 692, 723, 728, 738, 742, 838, 843, 844, 847, 859, 879, 883, 968, 971, 986, 988, 996, 1005, 1034, 1046, 1049, 1070, 1103, 1104, 1115, 1125, 1126, 1255, 1256, 1266, 1277, 1278, 1311, 1332, 1335, 1347, 1376, 1385, 1393, 1395, 1410, 1413, 1498, 1502, 1522, 1534, 1537, 1538, 1543, 1639, 1643, 1653, 1658, 1689, 1713, 1717, 1727, 1737, 1749, 1750, 1844, 1874, 1926, 1930, 1932, 1939, 1943, 1955, 1958, 1965, 1998, 1999, 2011, 2026, 2030, 2055, 2073, 2094, 2098, 2103, 2128, 2160, 2202, 2219, 2230, 2236, and 2244.

In another implementation, the length of the ZC sequence is 3823, and values of roots q are some or all of the following values: 194, 208, 217, 221, 250, 260, 285, 303, 308, 311, 335, 339, 372, 405, 443, 453, 454, 461, 495, 496, 524, 565, 568, 570, 571, 581, 594, 596, 599, 615, 618, 661, 663, 671, 679, 712, 814, 866, 888, 890, 1032, 1053, 1058, 1129, 1131, 1155, 1160, 1166, 1185, 1190, 1200, 1419, 1452, 1459, 1615, 1658, 1717, 1728, 1730, 1749, 1795, 2028, 2074, 2093, 2095, 2106, 2165, 2208, 2364, 2371, 2404, 2623, 2633, 2638, 2657, 2663, 2668, 2692, 2694, 2765, 2770, 2791, 2933, 2935, 2957, 3009, 3111, 3144, 3152, 3160, 3162, 3205, 3208, 3224, 3227, 3229, 3242, 3252, 3253, 3255, 3258, 3299, 3327, 3328, 3362, 3369, 3370, 3380, 3418, 3451, 3484, 3488, 3512, 3515, 3520, 3538, 3563, 3573, 3602, 3606, 3615, and 3629.

In another implementation, the length of the ZC sequence is 1949, and values of roots q are some or all of the following values: 96, 101, 106, 135, 142, 143, 157, 181, 182, 188, 201, 208, 227, 253, 262, 263, 264, 288, 291, 294, 306, 337, 338, 346, 363, 373, 414, 415, 427, 444, 445, 453, 454, 524, 543, 571, 579, 590, 592, 603, 612, 686, 690, 720, 721, 741, 744, 793, 799, 800, 818, 822, 844, 846, 849, 850, 882, 895, 896, 904, 912, 1037, 1045, 1053, 1054, 1067, 1099, 1100, 1103, 1105, 1127, 1131, 1149, 1150, 1156, 1205, 1208, 1228, 1229, 1259, 1263, 1337, 1346, 1357, 1359, 1370, 1378, 1406, 1425, 1495, 1496, 1504, 1505, 1522, 1534, 1535, 1576, 1586, 1603, 1611, 1612, 1643, 1655, 1658, 1661, 1685, 1686, 1687, 1696, 1722, 1741, 1748, 1761, 1767, 1768, 1792, 1806, 1807, 1814, 1843, 1848, and 1853.

In another implementation, the length of the ZC sequence is 2621, and values of roots q are some or all of the following values: 133, 135, 136, 141, 149, 157, 158, 160, 167, 170, 178, 191, 193, 197, 206, 211, 213, 255, 270, 301, 306, 339, 340, 391, 398, 407, 418, 450, 451, 487, 494, 508, 571, 574, 593, 609, 610, 696, 722, 735, 736, 773, 775, 792, 793, 815, 823, 931, 947, 962, 968, 972, 991, 993, 997, 1000, 1003, 1100, 1106, 1135, 1137, 1236, 1237, 1384, 1385, 1484, 1486, 1515, 1521, 1618, 1621, 1624, 1628, 1630, 1649, 1653, 1659, 1674, 1690, 1798, 1806, 1828, 1829, 1846, 1848, 1885, 1886, 1899, 1925, 2011, 2012, 2028, 2047, 2050, 2113, 2127, 2134, 2170, 2171, 2203, 2214, 2223, 2230, 2281, 2282, 2315, 2320, 2351, 2366, 2408, 2410, 2415, 2424, 2428, 2430, 2443, 2451, 2454, 2461, 2463, 2464, 2472, 2480, 2485, 2486, and 2488.

In another implementation, the length of the ZC sequence is 4481, and values of roots q are some or all of the following values: 259, 273, 275, 285, 293, 327, 330, 353, 361, 365, 387, 416, 419, 422, 436, 476, 577, 607, 608, 668, 680, 681, 683, 698, 714, 724, 782, 803, 845, 857, 859, 952, 1015, 1023, 1188, 1325, 1361, 1407, 1586, 1594, 1619, 1638, 1654, 1655, 1657, 1837, 1856, 1893, 1940, 1965, 1974, 2006, 2011, 2026, 2028, 2051, 2060, 2085, 2099, 2102, 2104, 2377, 2379, 2382, 2396, 2421, 2430, 2453, 2455, 2470, 2475, 2507, 2516, 2541, 2588, 2625, 2644, 2824, 2826, 2827, 2843, 2862, 2887, 2895, 3074, 3120, 3156, 3293, 3458, 3466, 3529, 3622, 3624, 3636, 3678, 3699, 3757, 3767, 3783, 3798, 3800, 3801, 3813, 3873, 3874, 3904, 4005, 4045, 4059, 4062, 4065, 4094, 4116, 4120, 4128, 4151, 4154, 4188, 4196, 4206, 4208, and 4222.

In another implementation, the length of the ZC sequence is 1301, and values of roots q are some or all of the following values: 67, 70, 74, 85, 89, 91, 95, 97, 98, 103, 112, 114, 116, 134, 140, 175, 180, 202, 225, 227, 277, 282, 284, 295, 305, 344, 345, 360, 365, 403, 405, 408, 458, 462, 481, 492, 494, 498, 533, 546, 549, 563, 565, 573, 588, 598, 614, 687, 703, 713, 728, 736, 738, 752, 755, 768, 803, 807, 809, 820, 839, 843, 893, 896, 898, 936, 941, 956, 957, 996, 1006, 1017, 1019, 1024, 1074, 1076, 1099, 1121, 1126, 1161, 1167, 1185, 1187, 1189, 1198, 1203, 1204, 1206, 1210, 1212, 1216, 1227, 1231, and 1234.

In another implementation, the length of the ZC sequence is 1699, and values of roots q are some or all of the following values: 88, 96, 109, 111, 119, 135, 160, 175, 180, 198, 202, 203, 223, 229, 233, 258, 264, 266, 270, 275, 314, 321, 322, 326, 383, 385, 451, 468, 494, 504, 529, 598, 605, 614, 650, 698, 704, 705, 712, 718, 737, 741, 745, 763, 787, 795, 797, 902, 904, 912, 936, 954, 958, 962, 981, 987, 994, 995, 1001, 1049, 1085, 1094, 1101, 1170, 1195, 1205, 1231, 1248, 1314, 1316, 1373, 1377, 1378, 1385, 1424, 1429, 1433, 1435, 1441, 1466, 1470, 1476, 1496, 1497, 1501, 1519, 1524, 1539, 1564, 1580, 1588, 1590, 1603, and 1611.

In another implementation, the length of the ZC sequence is 3187, and values of roots q are some or all of the following values: 180, 218, 221, 275, 280, 296, 298, 301, 307, 366, 410, 437, 438, 441, 471, 474, 513, 566, 601, 604, 677, 695, 846, 882, 965, 967, 968, 972, 973, 986, 992, 1128, 1134, 1145, 1149, 1177, 1182, 1221, 1320, 1350, 1400, 1404, 1456, 1481, 1491, 1495, 1692, 1696, 1706, 1731, 1783, 1787, 1837, 1867, 1966, 2005, 2010, 2038, 2042, 2053, 2059, 2195, 2201, 2214, 2215, 2219, 2220, 2222, 2305, 2341, 2492, 2510, 2583, 2586, 2621, 2674, 2713, 2716, 2746, 2749, 2750, 2777, 2821, 2880, 2886, 2889, 2891, 2907, 2912, 2966, 2969, and 3007.

In another implementation, the length of the ZC sequence is 4001, and values of roots q are some or all of the following values: 256, 262, 272, 295, 299, 301, 318, 340, 344, 346, 355, 371, 384, 391, 416, 424, 425, 427, 430, 901, 902, 1209, 1211, 1214, 1215, 1442, 1446, 1469, 1477, 1478, 1480, 1484, 1795, 1798, 1804, 1808, 1809, 1826, 1830, 1832, 1837, 1839, 1856, 1860, 1862, 2139, 2141, 2145, 2162, 2164, 2169, 2171, 2175, 2192, 2193, 2197, 2203, 2206, 2517, 2521, 2523, 2524, 2532, 2555, 2559, 2786, 2787, 2790, 2792, 3099, 3100, 3571, 3574, 3576, 3577, 3585, 3610, 3617, 3630, 3646, 3655, 3657, 3661, 3683, 3700, 3702, 3706, 3729, 3739, and 3745.

In another implementation, the length of the ZC sequence is 5147, and values of roots q are some or all of the following values: 334, 337, 350, 357, 360, 375, 378, 379, 385, 405, 439, 443, 445, 450, 451, 478, 480, 486, 500, 503, 504, 1166, 1167, 1555, 1558, 1563, 1564, 1574, 1592, 1855, 1860, 1882, 1884, 1889, 1890, 1900, 1904, 1909, 1910, 2305, 2312, 2313, 2330, 2388, 2392, 2395, 2752, 2755, 2759, 2817, 2834, 2835, 2842, 3237, 3238, 3243, 3247, 3257, 3258, 3263, 3265, 3287, 3292, 3555, 3573, 3583, 3584, 3589, 3592, 3980, 3981, 4643, 4644, 4647, 4661, 4667, 4669, 4696, 4697, 4702, 4704, 4708, 4742, 4762, 4768, 4769, 4772, 4787, 4790, 4797, 4810, and 4813.

In another implementation, the length of the ZC sequence is 8263, and values of roots q are some or all of the following values: 541, 562, 573, 602, 603, 616, 621, 672, 673, 702, 706, 713, 724, 726, 731, 736, 767, 772, 781, 796, 804, 888, 889, 2497, 2500, 2502, 2511, 2522, 2527, 2528, 2556, 2979, 2981, 2986, 3050, 3067, 3699, 3711, 3729, 3736, 3774, 3775, 3782, 3833, 3840, 4423, 4430, 4481, 4488, 4489, 4527, 4534, 4552, 4564, 5196, 5213, 5277, 5282, 5284, 5707, 5735, 5736, 5741, 5752, 5761, 5763, 5766, 7374, 7375, 7459, 7467, 7482, 7491, 7496, 7527, 7532, 7537, 7539, 7550, 7557, 7561, 7590, 7591, 7642, 7647, 7660, 7661, 7690, 7701, and 7722.

In another implementation, the length of the ZC sequence is 1523, and values of roots q are some or all of the following values: 75, 86, 88, 97, 99, 100, 121, 123, 148, 159, 181, 184, 197, 211, 227, 232, 245, 267, 270, 271, 280, 281, 289, 291, 322, 329, 345, 409, 412, 446, 460, 461, 465, 472, 474, 478, 536, 541, 558, 559, 577, 581, 589, 671, 684, 695, 708, 815, 828, 839, 852, 934, 942, 946, 964, 965, 982, 987, 1045, 1049, 1051, 1058, 1062, 1063, 1077, 1111, 1114, 1178, 1194, 1201, 1232, 1234, 1242, 1243, 1252, 1253, 1256, 1278, 1291, 1296, 1312, 1326, 1339, 1342, 1364, 1375, 1400, 1402, 1423, 1424, 1426, 1435, 1437, and 1448.

In another implementation, the length of the ZC sequence is 1907, and values of roots q are some or all of the following values: 102, 114, 115, 116, 117, 154, 155, 162, 170, 177, 183, 205, 219, 221, 222, 230, 245, 262, 307, 328, 432, 524, 535, 566, 576, 577, 590, 591, 598, 676, 688, 689, 690, 704, 707, 776, 778, 791, 798, 799, 827, 854, 857, 900, 901, 1006, 1007, 1050, 1053, 1080, 1108, 1109, 1116, 1129, 1131, 1200, 1203, 1217, 1218, 1219, 1231, 1309, 1316, 1317, 1330, 1331, 1341, 1372, 1383, 1475, 1579, 1600, 1645, 1662, 1677, 1685, 1686, 1688, 1702, 1724, 1730, 1737, 1745, 1752, 1753, 1790, 1791, 1792, 1793, and 1805.

In another implementation, the length of the ZC sequence is 3329, and values of roots q are some or all of the following values: 178, 188, 199, 212, 216, 231, 245, 249, 262, 309, 311, 388, 431, 437, 449, 451, 492, 503, 507, 517, 519, 529, 534, 581, 591, 596, 615, 618, 620, 629, 760, 775, 884, 901, 917, 975, 983, 1008, 1044, 1196, 1201, 1203, 1231, 1381, 1404, 1405, 1411, 1463, 1494, 1507, 1523, 1542, 1549, 1780, 1787, 1806, 1822, 1835, 1866, 1918, 1924, 1925, 1948, 2098, 2126, 2128, 2133, 2285, 2321, 2346, 2354, 2412, 2428, 2445, 2554, 2569, 2700, 2709, 2711, 2714, 2733, 2738, 2748, 2795, 2800, 2810, 2812, 2822, 2826, 2837, 2878, 2880, 2892, 2898, 2941, 3018, 3020, 3067, 3080, 3084, 3098, 3113, 3117, 3130, 3141, and 3151.

In another implementation, the length of the ZC sequence is 859, and values of roots q are some or all of the following values: 47, 55, 64, 73, 76, 84, 91, 100, 134, 137, 154, 162, 163, 166, 186, 228, 241, 254, 260, 261, 262, 314, 355, 356, 360, 363, 374, 375, 377, 386, 392, 393, 395, 464, 466, 467, 473, 482, 484, 485, 496, 499, 503, 504, 545, 597, 598, 599, 605, 618, 631, 673, 693, 696, 697, 705, 722, 725, 759, 768, 775, 783, 786, 795, 804, and 812.

In another implementation, the length of the ZC sequence is 1187, and values of roots q are some or all of the following values: 76, 77, 83, 104, 105, 114, 116, 126, 154, 175, 186, 208, 271, 278, 333, 345, 351, 363, 368, 428, 434, 453, 483, 490, 501, 514, 523, 545, 556, 557, 630, 631, 642, 664, 673, 686, 697, 704, 734, 753, 759, 819, 824, 836, 842, 854, 909, 916, 979, 1001, 1012, 1033, 1061, 1071, 1073, 1082, 1083, 1104, 1110, and 1111.

In another implementation, the length of the ZC sequence is 1933, and values of roots q are some or all of the following values: 98, 104, 118, 124, 169, 171, 189, 208, 222, 224, 233, 268, 308, 332, 334, 346, 357, 360, 365, 438, 449, 450, 452, 584, 587, 607, 685, 697, 708, 732, 801, 842, 843, 914, 1019, 1090, 1091, 1132, 1201, 1225, 1236, 1248, 1326, 1346, 1349, 1481, 1483, 1484, 1495, 1568, 1573, 1576, 1587, 1599, 1601, 1625, 1665, 1700, 1709, 1711, 1725, 1744, 1762, 1764, 1809, 1815, 1829, and 1835.

In another implementation, the length of the ZC sequence is 2309, and values of roots q are some or all of the following values: 147, 151, 157, 158, 170, 174, 183, 186, 226, 241, 246, 520, 523, 526, 706, 714, 830, 833, 846, 853, 856, 1034, 1037, 1041, 1042, 1044, 1045, 1057, 1071, 1073, 1236, 1238, 1252, 1264, 1265, 1267, 1268, 1272, 1275, 1453, 1456, 1463, 1476, 1479, 1595, 1603, 1783, 1786, 1789, 2063, 2068, 2083, 2123, 2126, 2135, 2139, 2151, 2152, 2158, and 2162.

In another implementation, the length of the ZC sequence is 2789, and values of roots q are some or all of the following values: 179, 195, 237, 245, 247, 259, 269, 271, 273, 300, 629, 631, 632, 846, 853, 1002, 1024, 1030, 1034, 1249, 1261, 1276, 1277, 1280, 1282, 1292, 1293, 1294, 1296, 1298, 1491, 1493, 1495, 1496, 1497, 1507, 1509, 1512, 1513, 1528, 1540, 1755, 1759, 1765, 1787, 1936, 1943, 2157, 2158, 2160, 2489, 2516, 2518, 2520, 2530, 2542, 2544, 2552, 2594, and 2610.

In another implementation, the length of the ZC sequence is 4481, and values of roots q are some or all of the following values: 275, 285, 293, 327, 330, 337, 353, 361, 365, 387, 416, 419, 422, 436, 476, 483, 1015, 1361, 1619, 1638, 1654, 1655, 1657, 2006, 2011, 2026, 2028, 2051, 2060, 2085, 2396, 2421, 2430, 2453, 2455, 2470, 2475, 2824, 2826, 2827, 2843, 2862, 3120, 3466, 3998, 4005, 4045, 4059, 4062, 4065, 4094, 4116, 4120, 4128, 4144, 4151, 4154, 4188, 4196, and 4206.

In another implementation, the length of the ZC sequence is 1123, and values of roots q are some or all of the following values: 55, 57, 61, 65, 69, 73, 77, 82, 84, 89, 105, 109, 130, 134, 154, 167, 196, 201, 202, 217, 218, 256, 257, 261, 263, 327, 329, 341, 395, 458, 476, 487, 514, 530, 531, 592, 593, 609, 636, 647, 665, 728, 782, 794, 796, 860, 862, 866, 867, 905, 906, 921, 922, 927, 956, 969, 989, 993, 1014, 1018, 1034, 1039, 1041, 1046, 1050, 1054, 1058, 1062, 1066, and 1068.

In another implementation, the length of the ZC sequence is 1279, and values of roots q are some or all of the following values: 66, 70, 83, 112, 125, 152, 154, 177, 189, 190, 191, 204, 207, 221, 229, 230, 236, 247, 292, 346, 374, 375, 401, 524, 525, 530, 536, 574, 587, 588, 691, 692, 705, 743, 749, 754, 755, 878, 904, 905, 933, 987, 1032, 1043, 1049, 1050, 1058, 1072, 1075, 1088, 1089, 1090, 1102, 1125, 1127, 1154, 1167, 1196, 1209, and 1213.

In another implementation, the length of the ZC sequence is 1933, and values of roots q are some or all of the following values: 98, 104, 118, 124, 169, 171, 189, 222, 224, 233, 268, 308, 332, 334, 346, 357, 360, 438, 449, 450, 452, 584, 587, 607, 685, 697, 708, 732, 801, 842, 843, 914, 1019, 1090, 1091, 1132, 1201, 1225, 1236, 1248, 1326, 1346, 1349, 1481, 1483, 1484, 1495, 1573, 1576, 1587, 1599, 1601, 1625, 1665, 1700, 1709, 1711, 1744, 1762, 1764, 1809, 1815, 1829, and 1835.

In another implementation, the length of the ZC sequence is 509, and values of roots q are some or all of the following values: 31, 41, 76, 94, 111, 143, 148, 151, 154, 195, 207, 209, 213, 233, 234, 240, 269, 275, 276, 296, 300, 302, 314, 355, 358, 361, 366, 398, 415, 433, 468, and 478.

In another implementation, the length of the ZC sequence is 1013, and values of roots q are some or all of the following values: 55, 65, 89, 159, 161, 174, 182, 191, 192, 236, 279, 366, 376, 445, 470, 474, 539, 543, 568, 637, 647, 734, 777, 821, 822, 831, 839, 852, 854, 924, 948, and 958.

In another implementation, the length of the ZC sequence is 977, and values of roots q are some or all of the following values: 67, 73, 83, 84, 92, 102, 105, 220, 298, 351, 353, 359, 439, 453, 454, 523, 524, 538, 618, 624, 626, 679, 757, 872, 875, 885, 893, 894, 904, and 910.

In another implementation, the length of the ZC sequence is 1447, and values of roots q are some or all of the following values: 92, 99, 109, 114, 128, 129, 139, 156, 438, 530, 648, 650, 653, 654, 662, 785, 793, 794, 797, 799, 917, 1009, 1291, 1308, 1318, 1319, 1333, 1338, 1348, and 1355.

In another implementation, the length of the ZC sequence is 2447, and values of roots q are some or all of the following values: 157, 160, 199, 215, 217, 235, 236, 260, 263, 758, 1099, 1104, 1106, 1120, 1135, 1312, 1327, 1341, 1343, 1348, 1689, 2184, 2187, 2211, 2212, 2230, 2232, 2248, 2287, and 2290.

In another implementation, the length of the ZC sequence is 563, and values of roots q are some or all of the following values: 29, 39, 58, 83, 100, 104, 108, 171, 202, 203, 208, 230, 247, 253, 254, 266, 297, 309, 310, 316, 333, 355, 360, 361, 392, 455, 459, 463, 480, 505, 524, and 534.

In another implementation, the length of the ZC sequence is 1013, and values of roots q are some or all of the following values: 55, 65, 89, 159, 161, 174, 182, 191, 236, 279, 366, 376, 445, 470, 474, 539, 543, 568, 637, 647, 734, 777, 822, 831, 839, 852, 854, 924, 948, and 958.

When a resource block quantity or a subcarrier quantity corresponding to a system bandwidth is greater than a resource block threshold, a length of a ZC sequence and a root set corresponding to the ZC sequence are one of the following:

(1) A comb value K is 1.

In an implementation, the length of the ZC sequence is 5279, and values of roots q are some or all of the following values: 260, 324, 359, 430, 490, 787, 804, 842, 849, 907, 925, 1010, 1018, 1190, 1399, 1424, 1615, 1645, 1655, 1658, 1875, 1957, 1958, 2001, 2014, 2015, 2212, 2228, 2304, 2320, 2325, 2954, 2959, 2975, 3051, 3067, 3264, 3265, 3278, 3321, 3322, 3404, 3621, 3624, 3634, 3664, 3855, 3880, 4089, 4261, 4269, 4354, 4372, 4430, 4437, 4475, 4492, 4789, 4849, 4920, 4955, and 5019.

In another implementation, the length of the ZC sequence is 10039, and values of roots q are some or all of the following values: 520, 536, 790, 816, 1083, 1172, 1190, 1192, 1529, 1576, 1601, 1762, 2134, 2662, 2797, 2978, 3033, 3070, 3104, 3148, 3153, 3574, 3629, 4085, 4099, 4145, 4166, 4373, 4511, 4543, 4734, 5305, 5496, 5528, 5666, 5873, 5894, 5940, 5954, 6410, 6465, 6886, 6891, 6935, 6969, 7006, 7061, 7242, 7377, 7905, 8277, 8438, 8463, 8510, 8847, 8849, 8867, 8956, 9223, 9249, 9503, and 9519.

In another implementation, the length of the ZC sequence is 5431, and values of roots q are some or all of the following values: 430, 461, 464, 475, 481, 513, 514, 1190, 1661, 1680, 1958, 2008, 2439, 2450, 2516, 2915, 2981, 2992, 3423, 3473, 3751, 3770, 4241, 4917, 4918, 4950, 4956, 4967, 4970, and 5001.

In another implementation, the length of the ZC sequence is 10979, and values of roots q are some or all of the following values: 699, 703, 718, 747, 818, 864, 938, 960, 1075, 1129, 3957, 4075, 4918, 4926, 4970, 5026, 5953, 6009, 6053, 6061, 6904, 7022, 9850, 9904, 10019, 10041, 10115, 10161, 10232, 10261, 10276, and 10280.

(2) A comb value K is 2.

In an implementation, the length of the ZC sequence is 4201, and values of roots q are some or all of the following values: 99, 119, 129, 133, 147, 203, 214, 218, 275, 288, 291, 305, 313, 330, 372, 390, 432, 437, 445, 565, 674, 758, 781, 798, 880, 893, 920, 946, 947, 950, 957, 996, 1011, 1113, 1115, 1140, 1240, 1272, 1274, 1281, 1330, 1348, 1436, 1445, 1463, 1477, 1496, 1509, 1597, 1598, 1648, 1830, 1834, 1931, 1993, 2006, 2012, 2019, 2025, 2034, 2038, 2163, 2167, 2176, 2182, 2189, 2195, 2208, 2270, 2367, 2371, 2553, 2603, 2604, 2692, 2705, 2724, 2738, 2756, 2765, 2853, 2871, 2920, 2927, 2929, 2961, 3061, 3086, 3088, 3190, 3205, 3244, 3251, 3254, 3255, 3281, 3308, 3321, 3403, 3420, 3443, 3527, 3636, 3756, 3764, 3769, 3811, 3829, 3871, 3888, 3896, 3910, 3913, 3926, 3983, 3987, 3998, 4054, 4068, 4072, 4082, and 4102.

In another implementation, the length of the ZC sequence is 6899, and values of roots q are some or all of the following values: 185, 188, 211, 249, 284, 318, 324, 340, 369, 399, 473, 519, 522, 547, 548, 564, 615, 643, 649, 650, 711, 806, 928, 936, 956, 1070, 1108, 1203, 1204, 1287, 1320, 1333, 1425, 1430, 1431, 1441, 1511, 1667, 1866, 1899, 1927, 2037, 2103, 2186, 2201, 2212, 2236, 2357, 2474, 2481, 2489, 2497, 2499, 2609, 2807, 2992, 3005, 3196, 3305, 3316, 3583, 3594, 3703, 3894, 3907, 4092, 4290, 4400, 4402, 4410, 4418, 4425, 4542, 4663, 4687, 4698, 4713, 4796, 4862, 4972, 5000, 5033, 5232, 5388, 5458, 5468, 5469, 5474, 5566, 5579, 5612, 5695, 5696, 5791, 5829, 5943, 5963, 5971, 6093, 6188, 6249, 6250, 6256, 6284, 6335, 6351, 6352, 6377, 6380, 6426, 6500, 6530, 6559, 6575, 6581, 6615, 6650, 6688, 6711, and 6714.

In another implementation, the length of the ZC sequence is 4729, and values of roots q are some or all of the following values: 142, 145, 154, 192, 202, 203, 240, 254, 269, 272, 348, 421, 509, 565, 713, 740, 820, 850, 878, 893, 905, 1002, 1007, 1066, 1078, 1219, 1254, 1271, 1277, 1282, 1321, 1329, 1377, 1385, 1395, 1429, 1436, 1447, 1465, 1511, 1524, 1536, 1616, 1627, 1649, 1713, 1726, 1732, 1829, 1860, 2005, 2060, 2064, 2140, 2213, 2234, 2255, 2265, 2274, 2275, 2285, 2290, 2291, 2303, 2305, 2306, 2423, 2424, 2426, 2438, 2439, 2444, 2454, 2455, 2464, 2474, 2495, 2516, 2589, 2665, 2669, 2724, 2869, 2900, 2997, 3003, 3016, 3080, 3102, 3113, 3193, 3205, 3218, 3264, 3282, 3293, 3300, 3334, 3344, 3352, 3400, 3408, 3447, 3452, 3458, 3475, 3510, 3651, 3663, 3722, 3727, 3824, 3836, 3851, 3879, 3909, 3989, 4016, 4164, 4220, 4308, 4381, 4457, 4460, 4475, 4489, 4526, 4527, 4537, 4575, 4584, and 4587.

In another implementation, the length of the ZC sequence is 7741, and values of roots q are some or all of the following values: 186, 195, 293, 340, 380, 393, 576, 681, 716, 723, 758, 833, 835, 889, 923, 932, 1024, 1041, 1179, 1329, 1463, 1609, 1648, 1688, 1755, 1804, 1813, 1829, 1854, 2029, 2095, 2122, 2133, 2158, 2283, 2342, 2343, 2399, 2400, 2458, 2482, 2509, 2705, 2774, 2777, 2790, 2859, 2871, 2963, 3180, 3196, 3212, 3214, 3216, 3352, 3362, 3397, 3499, 3602, 3657, 4084, 4139, 4242, 4344, 4379, 4389, 4525, 4527, 4529, 4545, 4561, 4778, 4870, 4882, 4951, 4964, 4967, 5036, 5232, 5259, 5283, 5341, 5342, 5398, 5399, 5458, 5583, 5608, 5619, 5646, 5712, 5887, 5912, 5928, 5937, 5986, 6053, 6093, 6132, 6278, 6412, 6562, 6700, 6717, 6809, 6818, 6852, 6906, 6908, 6983, 7018, 7025, 7060, 7165, 7348, 7361, 7401, 7448, 7546, and 7555.

In another implementation, the length of the ZC sequence is 2729, and values of roots q are some or all of the following values: 71, 75, 99, 108, 111, 147, 148, 173, 236, 240, 244, 326, 330, 361, 374, 402, 408, 433, 478, 479, 502, 507, 522, 530, 561, 572, 578, 598, 622, 648, 716, 723, 748, 867, 875, 935, 979, 1002, 1038, 1053, 1126, 1143, 1190, 1203, 1252, 1477, 1526, 1539, 1586, 1603, 1676, 1691, 1727, 1750, 1794, 1854, 1862, 1981, 2006, 2013, 2081, 2107, 2131, 2151, 2157, 2168, 2199, 2207, 2222, 2227, 2250, 2251, 2296, 2321, 2327, 2355, 2368, 2399, 2403, 2485, 2489, 2493, 2556, 2581, 2582, 2618, 2621, 2630, 2654, and 2658.

In another implementation, the length of the ZC sequence is 5297, and values of roots q are some or all of the following values: 127, 142, 162, 199, 207, 217, 228, 244, 305, 426, 569, 570, 617, 638, 719, 821, 941, 1005, 1006, 1012, 1101, 1112, 1120, 1201, 1251, 1282, 1291, 1420, 1429, 1436, 1455, 1486, 1564, 1620, 1681, 1858, 1933, 1944, 2049, 2156, 2187, 2333, 2430, 2546, 2559, 2571, 2582, 2715, 2726, 2738, 2751, 2867, 2964, 3110, 3141, 3248, 3353, 3364, 3439, 3616, 3677, 3733, 3811, 3842, 3861, 3868, 3877, 4006, 4015, 4046, 4096, 4177, 4185, 4196, 4285, 4291, 4292, 4356, 4476, 4578, 4659, 4680, 4727, 4728, 4871, 4992, 5053, 5069, 5080, 5090, 5098, 5135, 5155, and 5170.

In another implementation, the length of the ZC sequence is 3607, and values of roots q are some or all of the following values: 85, 152, 154, 174, 262, 273, 296, 306, 335, 337, 351, 372, 418, 464, 486, 536, 572, 625, 663, 672, 692, 753, 764, 788, 811, 817, 944, 954, 1013, 1094, 1118, 1152, 1158, 1166, 1268, 1367, 1380, 1415, 1522, 1583, 1620, 1630, 1646, 1660, 1673, 1722, 1733, 1874, 1885, 1934, 1947, 1961, 1977, 1987, 2024, 2085, 2192, 2227, 2240, 2339, 2441, 2449, 2455, 2489, 2513, 2594, 2653, 2663, 2790, 2796, 2819, 2843, 2854, 2915, 2935, 2944, 2982, 3035, 3071, 3121, 3143, 3189, 3235, 3256, 3270, 3272, 3301, 3311, 3334, 3345, 3433, 3453, 3455, and 3522.

In another implementation, the length of the ZC sequence is 6353, and values of roots q are some or all of the following values: 156, 175, 196, 203, 217, 284, 345, 359, 382, 412, 445, 447, 478, 499, 503, 505, 542, 592, 740, 863, 964, 1392, 1432, 1454, 1653, 1668, 1708, 1746, 1772, 1785, 2013, 2182, 2188, 2215, 2358, 2505, 2661, 2685, 2792, 2845, 3062, 3064, 3070, 3076, 3092, 3261, 3277, 3283, 3289, 3291, 3508, 3561, 3668, 3692, 3848, 3995, 4138, 4165, 4171, 4340, 4568, 4581, 4607, 4645, 4685, 4700, 4899, 4921, 4961, 5389, 5490, 5613, 5761, 5811, 5848, 5850, 5854, 5875, 5906, 5908, 5941, 5971, 5994, 6008, 6069, 6136, 6150, 6157, 6178, and 6197.

In another implementation, the length of the ZC sequence is 4703, and values of roots q are some or all of the following values: 540, 559, 611, 644, 701, 736, 750, 822, 824, 846, 1064, 1246, 1272, 1302, 1310, 1369, 1378, 1423, 1438, 1475, 1476, 1654, 1723, 1726, 1744, 1927, 1928, 1942, 2049, 2053, 2064, 2105, 2598, 2639, 2650, 2654, 2761, 2775, 2776, 2959, 2977, 2980, 3049, 3227, 3228, 3265, 3280, 3325, 3334, 3393, 3401, 3431, 3457, 3639, 3857, 3879, 3881, 3953, 3967, 4002, 4059, 4092, 4144, and 4163.

In another implementation, the length of the ZC sequence is 9623, and values of roots q are some or all of the following values: 1020, 1141, 1143, 1160, 1245, 1268, 1319, 1686, 1689, 1818, 1839, 1846, 2098, 2102, 2180, 2236, 2586, 2818, 2856, 2858, 3387, 3407, 3468, 3533, 3569, 3647, 3684, 3945, 4167, 4190, 4197, 5426, 5433, 5456, 5678, 5939, 5976, 6054, 6090, 6155, 6216, 6236, 6765, 6767, 6805, 7037, 7387, 7443, 7521, 7525, 7777, 7784, 7805, 7934, 7937, 8304, 8355, 8378, 8463, 8480, 8482, and 8603.

In another implementation, the length of the ZC sequence is 2377, and values of roots q are some or all of the following values: 63, 76, 111, 179, 192, 195, 362, 411, 499, 569, 612, 668, 721, 722, 725, 728, 759, 766, 882, 901, 910, 917, 926, 965, 987, 1048, 1113, 1115, 1116, 1121, 1122, 1255, 1256, 1261, 1262, 1264, 1329, 1390, 1412, 1451, 1460, 1467, 1476, 1495, 1611, 1618, 1649, 1652, 1655, 1656, 1709, 1765, 1808, 1878, 1966, 2015, 2182, 2185, 2198, 2266, 2301, and 2314.

In another implementation, the length of the ZC sequence is 3469, and values of roots q are some or all of the following values: 82, 122, 135, 148, 261, 273, 279, 309, 320, 324, 334, 399, 538, 600, 663, 665, 670, 739, 758, 782, 805, 907, 916, 1013, 1204, 1244, 1271, 1353, 1505, 1588, 1686, 1783, 1881, 1964, 2116, 2198, 2225, 2265, 2456, 2553, 2562, 2664, 2687, 2711, 2730, 2799, 2804, 2806, 2869, 2931, 3070, 3135, 3145, 3149, 3160, 3190, 3196, 3208, 3321, 3334, 3347, and 3387.

In another implementation, the length of the ZC sequence is 8089, and values of roots q are some or all of the following values: 194, 209, 217, 240, 267, 303, 519, 748, 777, 872, 1260, 1392, 1399, 1455, 1535, 1548, 1563, 1692, 1747, 1834, 1933, 2117, 2121, 2364, 2783, 2808, 2844, 2919, 2986, 3155, 3767, 3785, 3838, 3856, 3865, 4224, 4233, 4251, 4304, 4322, 4934, 5103, 5170, 5245, 5281, 5306, 5725, 5968, 5972, 6156, 6255, 6342, 6397, 6526, 6541, 6554, 6634, 6690, 6697, 6829, 7217, 7312, 7341, 7570, 7786, 7822, 7849, 7872, 7880, and 7895.

In another implementation, the length of the ZC sequence is 5119, and values of roots q are some or all of the following values: 173, 174, 180, 199, 207, 217, 688, 693, 887, 897, 978, 1061, 1069, 1074, 1237, 1238, 1496, 1499, 1612, 1763, 1767, 1777, 1778, 1785, 1893, 1947, 1995, 2009, 2160, 2434, 2444, 2454, 2665, 2675, 2685, 2959, 3110, 3124, 3172, 3226, 3334, 3341, 3342, 3352, 3356, 3507, 3620, 3623, 3881, 3882, 4045, 4050, 4058, 4141, 4222, 4232, 4426, 4431, 4902, 4912, 4920, 4939, 4945, and 4946.

In another implementation, the length of the ZC sequence is 8089, and values of roots q are some or all of the following values: 266, 267, 273, 275, 285, 303, 329, 943, 1209, 1290, 1401, 1535, 1548, 1559, 1692, 1933, 2094, 2104, 2117, 2120, 2121, 2364, 2808, 2840, 2844, 2986, 2988, 3155, 3412, 3838, 3856, 3865, 3898, 4191, 4224, 4233, 4251, 4677, 4934, 5101, 5103, 5245, 5249, 5281, 5725, 5968, 5969, 5972, 5985, 5995, 6156, 6397, 6530, 6541, 6554, 6688, 6799, 6880, 7146, 7760, 7786, 7804, 7814, 7816, 7822, and 7823.

In another implementation, the length of the ZC sequence is 2683, and values of roots q are some or all of the following values: 65, 76, 101, 154, 200, 240, 364, 368, 401, 417, 480, 570, 582, 607, 635, 641, 704, 728, 747, 797, 844, 924, 941, 953, 1164, 1183, 1216, 1259, 1260, 1281, 1286, 1289, 1394, 1397, 1402, 1423, 1424, 1467, 1500, 1519, 1730, 1742, 1759, 1839, 1886, 1936, 1955, 1979, 2042, 2048, 2076, 2101, 2113, 2203, 2266, 2282, 2315, 2319, 2443, 2483, 2529, 2582, 2607, and 2618.

In another implementation, the length of the ZC sequence is 3733, and values of roots q are some or all of the following values: 99, 173, 261, 294, 321, 349, 360, 401, 502, 512, 563, 582, 693, 697, 704, 720, 885, 976, 1013, 1040, 1329, 1342, 1352, 1425, 1459, 1525, 1690, 1705, 1751, 1774, 1809, 1814, 1919, 1924, 1959, 1982, 2028, 2043, 2208, 2274, 2308, 2381, 2391, 2404, 2693, 2720, 2757, 2848, 3013, 3029, 3036, 3040, 3151, 3170, 3221, 3231, 3332, 3373, 3384, 3412, 3439, 3472, 3560, and 3634.

In another implementation, the length of the ZC sequence is 4217, and values of roots q are some or all of the following values: 543, 578, 580, 629, 669, 756, 776, 807, 899, 914, 951, 1603, 1630, 1728, 1767, 2450, 2489, 2587, 2614, 3266, 3303, 3318, 3410, 3441, 3461, 3548, 3588, 3637, 3639, and 3674.

In another implementation, the length of the ZC sequence is 5791, and values of roots q are some or all of the following values: 781, 865, 909, 1076, 1079, 1108, 1111, 1231, 1233, 1254, 1306, 1356, 2216, 2217, 2366, 2400, 3391, 3425, 3574, 3575, 4435, 4485, 4537, 4558, 4560, 4680, 4683, 4712, 4715, 4882, 4926, and 5010.

In another implementation, the length of the ZC sequence is 3541, and values of roots q are some or all of the following values: 105, 140, 171, 277, 330, 458, 490, 555, 654, 669, 743, 823, 1237, 1270, 1372, 1384, 2157, 2169, 2271, 2304, 2718, 2798, 2872, 2887, 2986, 3051, 3083, 3211, 3264, 3370, 3401, and 3436.

In another implementation, the length of the ZC sequence is 2591, and values of roots q are some or all of the following values: 94, 121, 352, 538, 613, 615, 620, 623, 674, 834, 835, 956, 1128, 1236, 1246, 1345, 1355, 1463, 1635, 1756, 1757, 1917, 1968, 1971, 1976, 1978, 2053, 2239, 2470, and 2497.

In another implementation, the length of the ZC sequence is 4463, and values of roots q are some or all of the following values: 189, 521, 664, 708, 774, 782, 860, 935, 1161, 1556, 1651, 1832, 1947, 1948, 2147, 2316, 2515, 2516, 2631, 2812, 2907, 3302, 3528, 3603, 3681, 3689, 3755, 3799, 3942, and 4274.

(3) A comb value K is 4.

In an implementation, the length of the ZC sequence is 3919, and values of roots q are some or all of the following values: 193, 203, 251, 274, 289, 308, 337, 366, 383, 407, 450, 466, 517, 527, 531, 597, 611, 679, 684, 685, 688, 749, 751, 752, 756, 760, 833, 856, 913, 1149, 1184, 1190, 1195, 1196, 1199, 1215, 1230, 1418, 1488, 1490, 1496, 1515, 1600, 1601, 1609, 1617, 1642, 1653, 1654, 1696, 1697, 1700, 1755, 1759, 1761, 1767, 1794, 1835, 1838, 1839, 1852, 2067, 2080, 2081, 2084, 2125, 2152, 2158, 2160, 2164, 2219, 2222, 2223, 2265, 2266, 2277, 2302, 2310, 2318, 2319, 2404, 2423, 2429, 2431, 2501, 2689, 2704, 2720, 2723, 2724, 2729, 2735, 2770, 3006, 3063, 3086, 3159, 3163, 3167, 3168, 3170, 3231, 3234, 3235, 3240, 3308, 3322, 3388, 3392, 3402, 3453, 3469, 3512, 3536, 3553, 3582, 3611, 3630, 3645, 3668, 3716, and 3726.

In another implementation, the length of the ZC sequence is 6703, and values of roots q are some or all of the following values: 358, 364, 385, 388, 412, 425, 438, 440, 489, 540, 546, 593, 626, 633, 699, 712, 783, 808, 863, 904, 1001, 1019, 1045, 1078, 1159, 1161, 1200, 1238, 1239, 1272, 1273, 1424, 1427, 1511, 1528, 1847, 1867, 1982, 2036, 2050, 2373, 2385, 2405, 2417, 2535, 2548, 2565, 2778, 2804, 2907, 2923, 2924, 3066, 3108, 3109, 3110, 3115, 3119, 3136, 3161, 3542, 3567, 3584, 3588, 3593, 3594, 3595, 3637, 3779, 3780, 3796, 3899, 3925, 4138, 4155, 4168, 4286, 4298, 4318, 4330, 4653, 4667, 4721, 4836, 4856, 5175, 5192, 5276, 5279, 5430, 5431, 5464, 5465, 5503, 5542, 5544, 5625, 5658, 5684, 5702, 5799, 5840, 5895, 5920, 5991, 6004, 6070, 6077, 6110, 6157, 6163, 6214, 6263, 6265, 6278, 6291, 6315, 6318, 6339, and 6345.

In another implementation, the length of the ZC sequence is 4447, and values of roots q are some or all of the following values: 227, 229, 257, 271, 305, 358, 413, 419, 427, 474, 478, 516, 518, 528, 536, 572, 577, 664, 691, 698, 714, 777, 799, 822, 828, 862, 974, 1003, 1013, 1035, 1036, 1194, 1199, 1225, 1239, 1293, 1303, 1321, 1343, 1346, 1356, 1375, 1574, 1582, 1607, 1609, 1645, 1684, 1699, 1816, 1827, 1842, 1843, 1884, 1941, 1959, 1996, 2032, 2086, 2111, 2336, 2361, 2415, 2451, 2488, 2506, 2563, 2604, 2605, 2620, 2631, 2748, 2763, 2802, 2838, 2840, 2865, 2873, 3072, 3091, 3101, 3104, 3126, 3144, 3154, 3208, 3222, 3248, 3253, 3411, 3412, 3434, 3444, 3473, 3585, 3619, 3625, 3648, 3670, 3733, 3749, 3756, 3783, 3870, 3875, 3911, 3919, 3929, 3931, 3969, 3973, 4020, 4028, 4034, 4089, 4142, 4176, 4190, 4218, and 4220.

In another implementation, the length of the ZC sequence is 7559, and values of roots q are some or all of the following values: 390, 406, 413, 452, 464, 484, 485, 595, 615, 650, 661, 706, 714, 876, 881, 883, 896, 996, 1035, 1046, 1116, 1117, 1140, 1214, 1222, 1307, 1311, 1324, 1327, 1358, 1397, 1458, 1601, 1606, 1648, 1656, 1730, 1761, 1996, 2045, 2083, 2092, 2121, 2197, 2214, 2230, 2287, 2355, 2661, 2685, 2733, 2735, 2884, 3076, 3088, 3121, 3166, 3188, 3322, 3452, 3460, 3514, 3537, 4022, 4045, 4099, 4107, 4237, 4371, 4393, 4438, 4471, 4483, 4675, 4824, 4826, 4874, 4898, 5204, 5272, 5329, 5345, 5362, 5438, 5467, 5476, 5514, 5563, 5798, 5829, 5903, 5911, 5953, 5958, 6101, 6162, 6201, 6232, 6235, 6248, 6252, 6337, 6345, 6419, 6442, 6443, 6513, 6524, 6563, 6663, 6676, 6678, 6683, 6845, 6853, 6898, 6909, 6944, 6964, 7074, 7075, 7095, 7107, 7146, 7153, and 7169.

In another implementation, the length of the ZC sequence is 2621, and values of roots q are some or all of the following values: 133, 135, 140, 148, 149, 157, 167, 193, 206, 211, 213, 270, 301, 340, 391, 450, 451, 488, 509, 574, 610, 614, 692, 693, 695, 696, 736, 773, 775, 792, 802, 815, 822, 823, 962, 991, 993, 1000, 1003, 1074, 1083, 1144, 1216, 1236, 1237, 1384, 1385, 1405, 1477, 1538, 1547, 1618, 1621, 1628, 1630, 1659, 1798, 1799, 1806, 1819, 1829, 1846, 1848, 1885, 1925, 1926, 1928, 1929, 2007, 2011, 2047, 2112, 2133, 2170, 2171, 2230, 2281, 2320, 2351, 2408, 2410, 2415, 2428, 2454, 2464, 2472, 2473, 2481, 2486, and 2488.

In another implementation, the length of the ZC sequence is 5197, and values of roots q are some or all of the following values: 278, 319, 360, 455, 499, 505, 552, 602, 605, 714, 836, 908, 923, 956, 987, 996, 1172, 1186, 1406, 1460, 1520, 1534, 1573, 1590, 1616, 1632, 1840, 1846, 1847, 1879, 1965, 1969, 1991, 2122, 2123, 2133, 2156, 2174, 2192, 2250, 2283, 2349, 2415, 2432, 2456, 2466, 2731, 2741, 2765, 2782, 2848, 2914, 2947, 3005, 3023, 3041, 3064, 3074, 3075, 3206, 3228, 3232, 3318, 3350, 3351, 3357, 3565, 3581, 3607, 3624, 3663, 3677, 3737, 3791, 4011, 4025, 4201, 4210, 4241, 4274, 4289, 4361, 4483, 4592, 4595, 4645, 4692, 4698, 4742, 4837, 4878, and 4919.

In another implementation, the length of the ZC sequence is 3359, and values of roots q are some or all of the following values: 174, 191, 206, 250, 251, 253, 264, 295, 299, 312, 314, 324, 326, 356, 453, 456, 462, 499, 512, 535, 578, 649, 652, 736, 787, 923, 928, 938, 992, 993, 997, 1015, 1205, 1211, 1272, 1287, 1380, 1419, 1458, 1465, 1480, 1544, 1561, 1576, 1584, 1585, 1774, 1775, 1783, 1798, 1815, 1879, 1894, 1901, 1940, 1979, 2072, 2087, 2148, 2154, 2344, 2362, 2366, 2367, 2421, 2431, 2436, 2572, 2623, 2707, 2710, 2781, 2824, 2847, 2860, 2897, 2903, 2906, 3003, 3033, 3035, 3045, 3047, 3060, 3064, 3095, 3106, 3108, 3109, 3153, 3168, and 3185.

In another implementation, the length of the ZC sequence is 5851, and values of roots q are some or all of the following values: 336, 356, 436, 518, 547, 621, 672, 759, 809, 892, 941, 1243, 1267, 1278, 1318, 1545, 1632, 1643, 1731, 1767, 1778, 1789, 1835, 2074, 2083, 2114, 2117, 2143, 2150, 2160, 2224, 2427, 2452, 2468, 2469, 2480, 2533, 2567, 2577, 2621, 2648, 2672, 2673, 2677, 2678, 2679, 2720, 2723, 3128, 3131, 3172, 3173, 3174, 3178, 3179, 3203, 3230, 3274, 3284, 3318, 3371, 3382, 3383, 3399, 3424, 3627, 3691, 3701, 3708, 3734, 3737, 3768, 3777, 4016, 4062, 4073, 4084, 4120, 4208, 4219, 4306, 4533, 4573, 4584, 4608, 4910, 4959, 5042, 5092, 5179, 5230, 5304, 5333, 5415, 5495, and 5515.

In another implementation, the length of the ZC sequence is 2153, and values of roots q are some or all of the following values: 131, 141, 175, 251, 284, 321, 338, 342, 372, 401, 456, 459, 493, 593, 596, 626, 627, 639, 666, 762, 776, 779, 787, 816, 876, 879, 935, 938, 966, 997, 1001, 1152, 1156, 1187, 1215, 1218, 1274, 1277, 1337, 1366, 1374, 1377, 1391, 1487, 1514, 1526, 1527, 1557, 1560, 1660, 1694, 1697, 1752, 1781, 1811, 1815, 1832, 1869, 1902, 1978, 2012, and 2022.

In another implementation, the length of the ZC sequence is 3187, and values of roots q are some or all of the following values: 173, 251, 275, 280, 298, 366, 437, 441, 474, 499, 513, 565, 589, 677, 695, 698, 722, 862, 972, 973, 986, 991, 993, 1001, 1182, 1205, 1308, 1404, 1503, 1512, 1675, 1684, 1783, 1879, 1982, 2005, 2186, 2194, 2196, 2201, 2214, 2215, 2325, 2465, 2489, 2492, 2510, 2598, 2622, 2674, 2688, 2713, 2746, 2750, 2821, 2889, 2907, 2912, 2936, and 3014.

In another implementation, the length of the ZC sequence is 6011, and values of roots q are some or all of the following values: 383, 409, 412, 417, 418, 438, 441, 484, 489, 514, 520, 569, 584, 627, 637, 1318, 1355, 1360, 1816, 1833, 2207, 2697, 2700, 2710, 2717, 2721, 2745, 2746, 2763, 2797, 3214, 3248, 3265, 3266, 3290, 3294, 3301, 3311, 3314, 3804, 4178, 4195, 4651, 4656, 4693, 5374, 5384, 5427, 5442, 5491, 5497, 5522, 5527, 5570, 5573, 5593, 5594, 5599, 5602, and 5628.

In another implementation, the length of the ZC sequence is 8387, and values of roots q are some or all of the following values: 537, 538, 575, 581, 582, 612, 660, 717, 742, 748, 792, 809, 814, 815, 820, 864, 872, 875, 891, 895, 1900, 2534, 2547, 3024, 3031, 3032, 3070, 3096, 3113, 3756, 3757, 3764, 3769, 3785, 3791, 3839, 3855, 4532, 4548, 4596, 4602, 4618, 4623, 4630, 4631, 5274, 5291, 5317, 5355, 5356, 5363, 5840, 5853, 6487, 7492, 7496, 7512, 7515, 7523, 7567, 7572, 7573, 7578, 7595, 7639, 7645, 7670, 7727, 7775, 7805, 7806, 7812, 7849, and 7850.

In another implementation, the length of the ZC sequence is 2203, and values of roots q are some or all of the following values: 151, 154, 193, 206, 230, 234, 253, 303, 351, 381, 382, 392, 416, 421, 469, 480, 499, 512, 578, 585, 594, 596, 669, 674, 794, 833, 843, 905, 913, 961, 966, 990, 1011, 1192, 1213, 1237, 1242, 1290, 1298, 1360, 1370, 1409, 1529, 1534, 1607, 1609, 1618, 1625, 1691, 1704, 1723, 1734, 1782, 1787, 1811, 1821, 1822, 1852, 1900, 1950, 1969, 1973, 1997, 2010, 2049, and 2052.

In another implementation, the length of the ZC sequence is 3527, and values of roots q are some or all of the following values: 179, 199, 257, 259, 263, 305, 309, 314, 404, 412, 536, 548, 607, 610, 618, 631, 665, 749, 795, 798, 804, 822, 826, 1071, 1106, 1296, 1449, 1461, 1463, 1494, 1554, 1580, 1947, 1973, 2033, 2064, 2066, 2078, 2231, 2421, 2456, 2701, 2705, 2723, 2729, 2732, 2778, 2862, 2896, 2909, 2917, 2920, 2979, 2991, 3115, 3123, 3213, 3218, 3222, 3264, 3268, 3270, 3328, and 3348.

In another implementation, the length of the ZC sequence is 1103, and values of roots q are some or all of the following values: 56, 59, 131, 133, 142, 321, 323, 391, 392, 426, 479, 484, 494, 504, 507, 596, 599, 609, 619, 624, 677, 711, 712, 780, 782, 961, 970, 972, 1044, and 1047.

In another implementation, the length of the ZC sequence is 2309, and values of roots q are some or all of the following values: 147, 151, 157, 158, 174, 183, 241, 246, 520, 523, 526, 706, 830, 856, 1041, 1045, 1071, 1238, 1264, 1268, 1453, 1479, 1603, 1783, 1786, 1789, 2063, 2068, 2126, 2135, 2151, 2152, 2158, and 2162.

In another implementation, the length of the ZC sequence is 3863, and values of roots q are some or all of the following values: 245, 246, 268, 288, 304, 314, 334, 403, 410, 875, 1173, 1394, 1396, 1415, 1426, 1730, 1767, 2096, 2133, 2437, 2448, 2467, 2469, 2690, 2988, 3453, 3460, 3529, 3549, 3559, 3575, 3595, 3617, and 3618.

This application further provides a wireless communication method, and the method includes: determining a reference signal sequence based on a ZC sequence, where the ZC sequence is any one of all the ZC sequences described above. For example, the ZC sequence may be one of the following:

A length of the ZC sequence is 1427, and values of roots q are some or all of the following values: 39, 78, 99, 105, 122, 132, 147, 254, 296, 298, 304, 341, 374, 399, 401, 417, 431, 435, 437, 512, 513, 524, 527, 542, 552, 582, 592, 644, 656, 664, 763, 771, 783, 835, 845, 875, 885, 900, 903, 914, 915, 990, 992, 996, 1010, 1026, 1028, 1053, 1086, 1123, 1129, 1131, 1173, 1280, 1295, 1305, 1322, 1328, 1349, and 1388.

A length of the ZC sequence is 1279, and values of roots q are some or all of the following values: 66, 70, 83, 112, 125, 152, 154, 177, 189, 190, 191, 204, 207, 221, 229, 230, 236, 247, 292, 346, 374, 375, 401, 524, 525, 530, 536, 574, 587, 588, 691, 692, 705, 743, 749, 754, 755, 878, 904, 905, 933, 987, 1032, 1043, 1049, 1050, 1058, 1072, 1075, 1088, 1089, 1090, 1102, 1125, 1127, 1154, 1167, 1196, 1209, and 1213.

A length of the ZC sequence is 3733, and values of roots q are some or all of the following values: 99, 173, 261, 294, 321, 349, 360, 401, 502, 512, 563, 582, 693, 697, 704, 720, 885, 976, 1013, 1040, 1329, 1342, 1352, 1425, 1459, 1525, 1690, 1705, 1751, 1774, 1809, 1814, 1919, 1924, 1959, 1982, 2028, 2043, 2208, 2274, 2308, 2381, 2391, 2404, 2693, 2720, 2757, 2848, 3013, 3029, 3036, 3040, 3151, 3170, 3221, 3231, 3332, 3373, 3384, 3412, 3439, 3472, 3560, and 3634.

A length of the ZC sequence is 3527, and values of roots q are some or all of the following values: 179, 199, 257, 259, 263, 305, 309, 314, 404, 412, 536, 548, 607, 610, 618, 631, 665, 749, 795, 798, 804, 822, 826, 1071, 1106, 1296, 1449, 1461, 1463, 1494, 1554, 1580, 1947, 1973, 2033, 2064, 2066, 2078, 2231, 2421, 2456, 2701, 2705, 2723, 2729, 2732, 2778, 2862, 2896, 2909, 2917, 2920, 2979, 2991, 3115, 3123, 3213, 3218, 3222, 3264, 3268, 3270, 3328, and 3348.

A length of the ZC sequence is 2621, and values of roots q are some or all of the following values: 133, 135, 140, 148, 157, 167, 178, 206, 211, 213, 301, 317, 340, 386, 391, 450, 451, 487, 488, 509, 574, 614, 692, 693, 695, 696, 736, 773, 802, 815, 822, 823, 962, 991, 993, 1000, 1003, 1083, 1216, 1236, 1237, 1384, 1385, 1405, 1538, 1618, 1621, 1628, 1630, 1659, 1798, 1799, 1806, 1819, 1848, 1885, 1925, 1926, 1928, 1929, 2007, 2047, 2112, 2133, 2134, 2170, 2171, 2230, 2235, 2281, 2304, 2320, 2408, 2410, 2415, 2443, 2454, 2464, 2473, 2481, 2486, and 2488.

A length of the ZC sequence is 2203, and values of roots q are some or all of the following values: 227, 230, 234, 237, 253, 285, 303, 351, 381, 382, 392, 416, 421, 469, 480, 499, 504, 512, 578, 585, 594, 596, 609, 669, 674, 683, 693, 794, 796, 833, 843, 905, 913, 954, 961, 966, 1237, 1242, 1249, 1290, 1298, 1360, 1370, 1407, 1409, 1510, 1520, 1529, 1534, 1594, 1607, 1609, 1618, 1625, 1691, 1699, 1704, 1723, 1734, 1782, 1787, 1811, 1821, 1822, 1852, 1900, 1918, 1950, 1966, 1969, 1973, and 1976.

A length of the ZC sequence is 5279, and values of roots q are some or all of the following values: 260, 324, 359, 430, 490, 787, 804, 842, 849, 907, 925, 1010, 1018, 1190, 1399, 1424, 1615, 1645, 1655, 1658, 1875, 1957, 1958, 2001, 2014, 2015, 2212, 2228, 2304, 2320, 2325, 2954, 2959, 2975, 3051, 3067, 3264, 3265, 3278, 3321, 3322, 3404, 3621, 3624, 3634, 3664, 3855, 3880, 4089, 4261, 4269, 4354, 4372, 4430, 4437, 4475, 4492, 4789, 4849, 4920, 4955, and 5019.

A length of the ZC sequence is 4703, and values of roots q are some or all of the following values: 540, 559, 611, 644, 701, 736, 750, 822, 824, 846, 1064, 1246, 1272, 1302, 1310, 1369, 1378, 1423, 1438, 1475, 1476, 1654, 1723, 1726, 1744, 1927, 1928, 1942, 2049, 2053, 2064, 2105, 2598, 2639, 2650, 2654, 2761, 2775, 2776, 2959, 2977, 2980, 3049, 3227, 3228, 3265, 3280, 3325, 3334, 3393, 3401, 3431, 3457, 3639, 3857, 3879, 3881, 3953, 3967, 4002, 4059, 4092, 4144, and 4163.

The foregoing describes in detail examples of the communication method provided in this application. It may be understood that, to implement the foregoing functions, a communications device includes a hardware structure and/or a software module for performing a corresponding function. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In this application, a communications device or the like may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software function unit. It should be noted that the unit division in this application is an example, and is merely logical function division. There may be another division manner in actual implementation.

Figure 5:
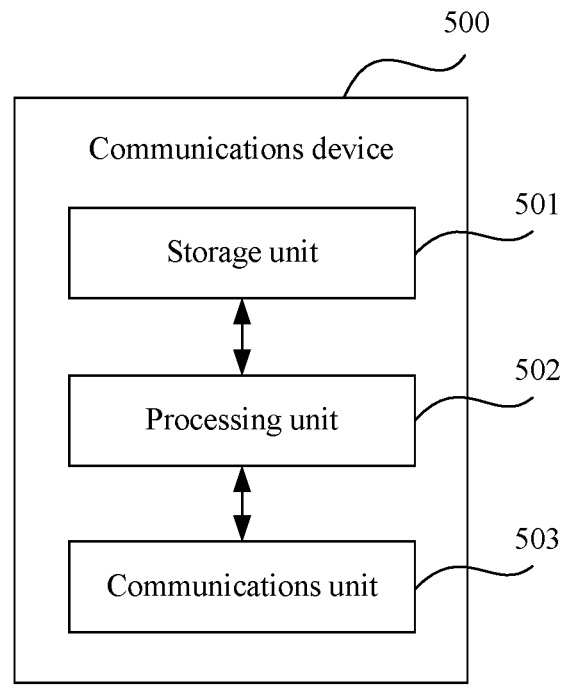
FIG. 5 is a possible schematic diagram of a communications device according to this application.

When an integrated unit is used, FIG. 5 is a possible schematic structural diagram of the communications device in the foregoing embodiment. A communications device 500 includes a processing unit 502 and a communications unit 503. The processing unit 502 is configured to control and manage an action of the communications device 500. For example, the processing unit 502 is configured to support the communications device 500 in performing S210 in FIG. 2 and/or another process of the technology described in this specification. The communications unit 503 is configured to support communication between the communications device 500 and another network entity, for example, communication between the communications device 500 and a network device. The communications device 500 may further include a storage unit 501, configured to store program code and data of the communications device 500.

The processing unit 502 may be a processor or a controller such as a central processing unit (CPU), a general-purpose processor, a digital signal processor (DSP), an application-specific integrated circuit (ASIC), a field programmable gate array (FPGA), another programmable logical device, a transistor logical device, a hardware component, or a combination thereof. The processing unit 502 may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. The communications unit 503 may be a transceiver, a transceiver circuit, or the like. The storage unit 501 may be a memory.

Figure 6:
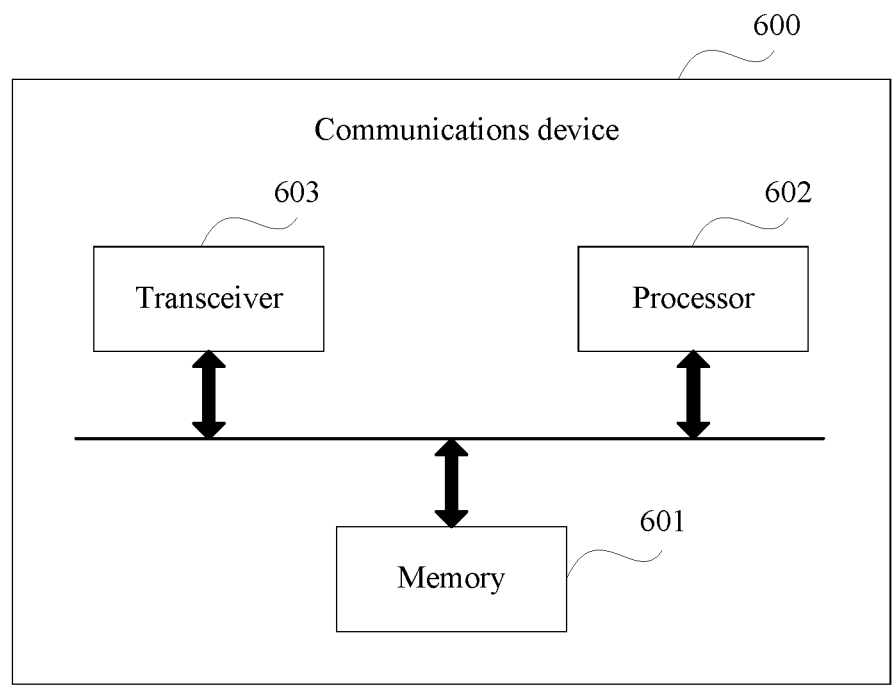
FIG. 6 is another possible schematic diagram of a communications device according to this application.

When the processing unit 502 is a processor, the communications unit 503 is a transceiver, and the storage unit 501 is a memory, the communications device in this application may be a communications device shown in FIG. 6.

As shown in FIG. 6, the communications device 600 includes a processor 602, a transceiver 603, and a memory 601. The transceiver 603, the processor 602, and the memory 601 may mutually communicate by using an internal connection channel, to transmit a control signal and/or a data signal.

It may be clearly understood by a person skilled in the art that, for the purpose of convenient and brief description, for a detailed working process of the device and unit described above, reference may be made to a corresponding process in the foregoing method embodiments. Details are not described herein again.

According to the communications device 500 and the communications device 600 provided in this application, when a same system bandwidth is used for communication, reference signal sequences used by different communications devices correspond to a same ZC sequence length. The ZC sequence length is exclusively designed for a resource block quantity or a carrier quantity of the system bandwidth.

Therefore, the reference signal sequences used by the communications devices provided in this application have a higher cross correlation than those in the prior art in which different system bandwidths correspond to a same ZC sequence length.

The communications device may be, for example, a terminal device or a base station.

It should be understood that the transceiver may include a transmitter and a receiver. The transceiver may further include an antenna. There may be one or more antennas. The memory may be an independent device, or may be integrated into the processor. All or some of the foregoing components may be integrated into a chip for implementation, for example, integrated into a baseband chip for implementation.

The network device or the terminal device in the apparatus embodiments fully corresponds to the network device or the terminal device in the method embodiments. A corresponding step is performed by a corresponding module. For example, a sending step in the method embodiments is performed by a sending module or a transmitter, a receiving step in the method embodiments is performed by a receiving module or a receiver, and steps other than the sending and receiving steps may be performed by a processing module or a processor. For a function of a specific module, refer to a corresponding method embodiment. Details are not described herein again.

An embodiment disclosed in this application further provides a communications chip. The communications chip stores an instruction, and when the instruction runs on the communications device 500 or the communications device 600, the communications chip performs the method corresponding to the terminal device in the foregoing implementations.

In the embodiments disclosed in this application, the sequence numbers of the processes do not mean execution sequences. The execution sequences of the processes should be determined based on functions and internal logic of the processes, and should not be construed as any limitation on the implementation processes of this application.

In addition, the term "and/or" in this specification is only an association relationship for describing associated objects, and represents that three relationships may exist. For example, "A and/or B" may represent the following three cases: only A exists, both A and B exist, and only B exists. In addition, the character "/" in this specification generally indicates an "or" relationship between associated objects.

Method or algorithm steps described in combination with the content in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (erasable programmable ROM, EPROM), an electrically erasable programmable read only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium, and can write information into the storage medium. Certainly, the storage medium may be a component of the processor. The processor and the storage medium may be located in an ASIC. In addition, the ASIC may be located in a communications device. Certainly, the processor and the storage medium may exist in the communications device as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) manner or a wireless (for example, infrared, radio, or microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a digital versatile disc (DVD), or a semiconductor medium (such as a solid state disk (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A wireless communication method, comprising:
   determining a length of a Zadoff-Chu sequence based on a resource block quantity corresponding to a system bandwidth and a comb value, wherein the length of the Zadoff-Chu sequence is a function of the resource block quantity, and when the resource block quantity corresponding to the system bandwidth is greater than a resource block threshold, and the comb value is a first value, the length of the Zadoff-Chu sequence is a first length;
   determining a reference signal sequence based on the length of the Zadoff-Chu sequence and a resource block quantity corresponding to an allocated user bandwidth, wherein
   the reference signal sequence is a function of the Zadoff-Chu sequence and the resource block quantity; and
   the reference signal sequence is comprised in an uplink reference signal, and the allocated user bandwidth is a part of the system bandwidth.

2. The method of claim 1, wherein the first value is 2, the first length is 3733, and a root of the Zadoff-Chu sequence is one of:
   99, 173, 261, 294, 321, 349, 360, 401, 502, 512, 563, 582, 693, 697, 704, 720, 885, 976, 1013, 1040, 1329, 1342, 1352, 1425, 1459, 1525, 1690, 1705, 1751, 1774, 1809, 1814, 1919, 1924, 1959, 1982, 2028, 2043, 2208, 2274, 2308, 2381, 2391, 2404, 2693, 2720, 2757, 2848, 3013, 3029, 3036, 3040, 3151, 3170, 3221, 3231, 3332, 3373, 3384, 3412, 3439, 3472, 3560, and 3634.

3. The method of claim 1, wherein the first value is 4, the first length is 3527, and a root of the Zadoff-Chu sequence is one of:

179, 199, 257, 259, 263, 305, 309, 314, 404, 412, 536, 548, 607, 610, 618, 631, 665, 749, 795, 798, 804, 822, 826, 1071, 1106, 1296, 1449, 1461, 1463, 1494, 1554, 1580, 1947, 1973, 2033, 2064, 2066, 2078, 2231, 2421, 2456, 2701, 2705, 2723, 2729, 2732, 2778, 2862, 2896, 2909, 2917, 2920, 2979, 2991, 3115, 3123, 3213, 3218, 3222, 3264, 3268, 3270, 3328, and 3348.

4. The method of claim 1, wherein when the resource block quantity corresponding to the system bandwidth is less than or equal to the resource block threshold, and the comb value is the first value, the length of the Zadoff-Chu sequence is a second length.

5. The method of claim 4, wherein the first value is 2, the second length is 1427, and a root of the Zadoff-Chu sequence is one of:

39, 78, 99, 105, 122, 132, 147, 254, 296, 298, 304, 341, 374, 399, 401, 417, 431, 435, 437, 512, 513, 524, 527, 542, 552, 582, 592, 644, 656, 664, 763, 771, 783, 835, 845, 875, 885, 900, 903, 914, 915, 990, 992, 996, 1010, 1026, 1028, 1053, 1086, 1123, 1129, 1131, 1173, 1280, 1295, 1305, 1322, 1328, 1349, and 1388.

6. The method of claim 4, wherein the first value is 4, the second length is 1279, and a root of the Zadoff-Chu sequence is one of:

66, 70, 83, 112, 125, 152, 154, 177, 189, 190, 191, 204, 207, 221, 229, 230, 236, 247, 292, 346, 374, 375, 401, 524, 525, 530, 536, 574, 587, 588, 691, 692, 705, 743, 749, 754, 755, 878, 904, 905, 933, 987, 1032, 1043, 1049, 1050, 1058, 1072, 1075, 1088, 1089, 1090, 1102, 1125, 1127, 1154, 1167, 1196, 1209, and 1213.

7. The method of claim 6, wherein the resource block threshold is one of the following values:

100, 102, 104, 105, 106, 108, and 110.

8. A wireless communications apparatus, comprising a memory, and a processor configured to execute computer programs stored in the memory such that when the computer programs are executed by the processor, wherein the wireless communications apparatus is caused to:

determine a length of a Zadoff-Chu sequence based on a resource block quantity corresponding to a system bandwidth and a comb value, wherein the length of the Zadoff-Chu sequence is a function of the resource block quantity, and when the resource block quantity corresponding to the system bandwidth is greater than a resource block threshold, and the comb value is a first value, the length of the Zadoff-Chu sequence is a first length;

determine a reference signal sequence based on the length of the Zadoff-Chu sequence and a resource block quantity corresponding to an allocated user bandwidth, wherein the reference signal sequence is a function of the Zadoff-Chu sequence and the resource block quantity; and the reference signal sequence is comprised in an uplink reference signal, and the allocated user bandwidth is a part of the system bandwidth; and cause the uplink reference signal to be transmitted.

9. The apparatus of claim 8, wherein the first value is 2, the first length is 3733, and a root of the Zadoff-Chu sequence is one of:

99, 173, 261, 294, 321, 349, 360, 401, 502, 512, 563, 582, 693, 697, 704, 720, 885, 976, 1013, 1040, 1329, 1342, 1352, 1425, 1459, 1525, 1690, 1705, 1751, 1774, 1809, 1814, 1919, 1924, 1959, 1982, 2028, 2043, 2208, 2274, 2308, 2381, 2391, 2404, 2693, 2720, 2757, 2848, 3013, 3029, 3036, 3040, 3151, 3170, 3221, 3231, 3332, 3373, 3384, 3412, 3439, 3472, 3560, and 3634.

10. The apparatus of claim 8, wherein the first value is 4, the first length is 3527, and a root of the Zadoff-Chu sequence is one of:

179, 199, 257, 259, 263, 305, 309, 314, 404, 412, 536, 548, 607, 610, 618, 631, 665, 749, 795, 798, 804, 822, 826, 1071, 1106, 1296, 1449, 1461, 1463, 1494, 1554, 1580, 1947, 1973, 2033, 2064, 2066, 2078, 2231, 2421, 2456, 2701, 2705, 2723, 2729, 2732, 2778, 2862, 2896, 2909, 2917, 2920, 2979, 2991, 3115, 3123, 3213, 3218, 3222, 3264, 3268, 3270, 3328, and 3348.

11. The apparatus of claim 10, wherein the resource block threshold is one of the following values:

100, 102, 104, 105, 106, 108, and 110.

12. A non-transitory computer-readable storage medium, wherein the computer-readable storage medium stores a computer program, and when the computer program is executed by a processing unit or a processor of a wireless communications apparatus, the wireless communications apparatus performs operations comprising:

determining a length of a Zadoff-Chu sequence based on a resource block quantity corresponding to a system bandwidth and a comb value, wherein the length of the Zadoff-Chu sequence is a function of the resource block quantity, and when the resource block quantity corresponding to the system bandwidth is greater than a resource block threshold, and the comb value is a first value, the length of the Zadoff-Chu sequence is a first length; and determining a reference signal sequence based on the length of the Zadoff-Chu sequence and a resource block quantity corresponding to an allocated user bandwidth, wherein the reference signal sequence is a function of the Zadoff-Chu sequence and the resource block quantity; and the reference signal sequence is comprised in an uplink reference signal, and the allocated user bandwidth is a part of the system bandwidth.

13. The computer-readable storage medium of claim 12, wherein when the resource block quantity corresponding to the system bandwidth is less than or equal to the resource block threshold, and the comb value is the first value, the length of the Zadoff-Chu sequence is a second length.

14. The computer-readable storage medium of claim 13, wherein the first value is 2, the second length is 1427, and a root of the Zadoff-Chu sequence is one of:

39, 78, 99, 105, 122, 132, 147, 254, 296, 298, 304, 341, 374, 399, 401, 417, 431, 435, 437, 512, 513, 524, 527, 542, 552, 582, 592, 644, 656, 664, 763, 771, 783, 835, 845, 875, 885, 900, 903, 914, 915, 990, 992, 996, 1010, 1026, 1028, 1053, 1086, 1123, 1129, 1131, 1173, 1280, 1295, 1305, 1322, 1328, 1349, and 1388.

15. The computer-readable storage medium of claim 13, wherein the first value is 4, the second length is 1279, and a root of the Zadoff-Chu sequence is one of:

66, 70, 83, 112, 125, 152, 154, 177, 189, 190, 191, 204, 207, 221, 229, 230, 236, 247, 292, 346, 374, 375, 401, 524, 525, 530, 536, 574, 587, 588, 691, 692, 705, 743, 749, 754, 755, 878, 904, 905, 933, 987, 1032, 1043, 1049, 1050, 1058, 1072, 1075, 1088, 1089, 1090, 1102, 1125, 1127, 1154, 1167, 1196, 1209, and 1213.

* * * * *